US010832483B2

(12) United States Patent
Oh et al.

(10) Patent No.: US 10,832,483 B2
(45) Date of Patent: Nov. 10, 2020

(54) APPARATUS AND METHOD OF MONITORING VR SICKNESS PREDICTION MODEL FOR VIRTUAL REALITY CONTENT

(71) Applicant: Electronics and Telecommunications Research Institute, Daejeon (KR)

(72) Inventors: Hee Seok Oh, Seoul (KR); Seung Woo Nam, Daejeon (KR); Wook Ho Son, Daejeon (KR); Beom Ryeol Lee, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 0 days.

(21) Appl. No.: 16/137,228

(22) Filed: Sep. 20, 2018

(65) Prior Publication Data

US 2019/0172264 A1 Jun. 6, 2019

(30) Foreign Application Priority Data

Dec. 5, 2017 (KR) .................. 10-2017-0166133
Dec. 5, 2017 (KR) .................. 10-2017-0166135

(51) Int. Cl.
*G06T 19/00* (2011.01)
*G06F 3/01* (2006.01)
*G06N 20/00* (2019.01)

(52) U.S. Cl.
CPC .......... *G06T 19/006* (2013.01); *G06F 3/012* (2013.01); *G06F 3/015* (2013.01); *G06N 20/00* (2019.01); *G01N 2800/40* (2013.01)

(58) Field of Classification Search
CPC ..... G01N 2800/40; G06F 3/012; G06F 3/015; G06T 19/006
See application file for complete search history.

(56) References Cited

U.S. PATENT DOCUMENTS

| 7,174,039 B2 | 2/2007 | Koo et al. | |
|---|---|---|---|
| 2003/0073922 A1* | 4/2003 | Miller | H04N 1/00 600/545 |
| 2012/0050325 A1 | 3/2012 | Joo et al. | |

(Continued)

FOREIGN PATENT DOCUMENTS

| KR | 1020130005082 A | 1/2013 |
|---|---|---|
| KR | 1020160110350 A | 9/2016 |

(Continued)

OTHER PUBLICATIONS

Cobb, Sue V. G. et al, "Virtual Reality-Induced Symptoms and Effects (VRISE)", Presence: Teleoperators & Virtual Environments, Apr. 1, 1999, pp. 170-186. (Year: 1999).*

(Continued)

*Primary Examiner* — Michelle L Sams
(74) *Attorney, Agent, or Firm* — William Park & Associates Ltd.

(57) ABSTRACT

Disclosed is an apparatus and method of monitoring a VR (Virtual Reality) sickness prediction model for virtual reality content. A method of monitoring a VR sickness prediction model according to the present disclosure includes: displaying the virtual reality content on a display unit; acquiring an user input; analyzing the virtual reality content on a basis of the acquired user input; and displaying an analysis result for the virtual reality content on the display unit.

12 Claims, 13 Drawing Sheets

(56) References Cited

U.S. PATENT DOCUMENTS

| | | |
|---|---|---|
| 2015/0325027 A1 | 11/2015 | Herman et al. |
| 2016/0228771 A1 | 8/2016 | Watson |
| 2016/0246057 A1 | 8/2016 | Hasegawa et al. |
| 2017/0255258 A1 | 9/2017 | Feiner et al. |
| 2018/0178808 A1* | 6/2018 | Zhao .................... G08B 21/06 |
| 2018/0182161 A1* | 6/2018 | Chaudhari ............ G06T 11/001 |
| 2019/0125255 A1* | 5/2019 | Pradeep ............... A61B 5/4094 |
| 2019/0150768 A1* | 5/2019 | Pradeep ................ G16H 20/30 |
| 2019/0197861 A1* | 6/2019 | Tunnell ............... G08B 27/001 |

FOREIGN PATENT DOCUMENTS

| | | |
|---|---|---|
| KR | 101663414 B1 | 10/2016 |
| KR | 1020170055135 A | 5/2017 |
| KR | 1020170101757 A | 9/2017 |
| KR | 1020170104846 A | 9/2017 |

OTHER PUBLICATIONS

Tanaka, Nobuhisa et al., "Virtual Reality Environment Design of Managing Both Presence and Virtual Reality Sickness", Journal of Physiological Anthropology and Applied Science, 2004 vol. 23 Issue 6 pg. 313-317. (Year: 2004).*
U.S. Appl. No. 62/579,300 of PGPub 20190150768 A1 (Year: 2017).*
Hironori Akiduki et al., "Visual-vestibular conflict induced by virtual reality in humans", Neuroscience Letters, Jan. 15, 2003, pp. 197-200, Elsevier.

* cited by examiner

[FIG. 1]
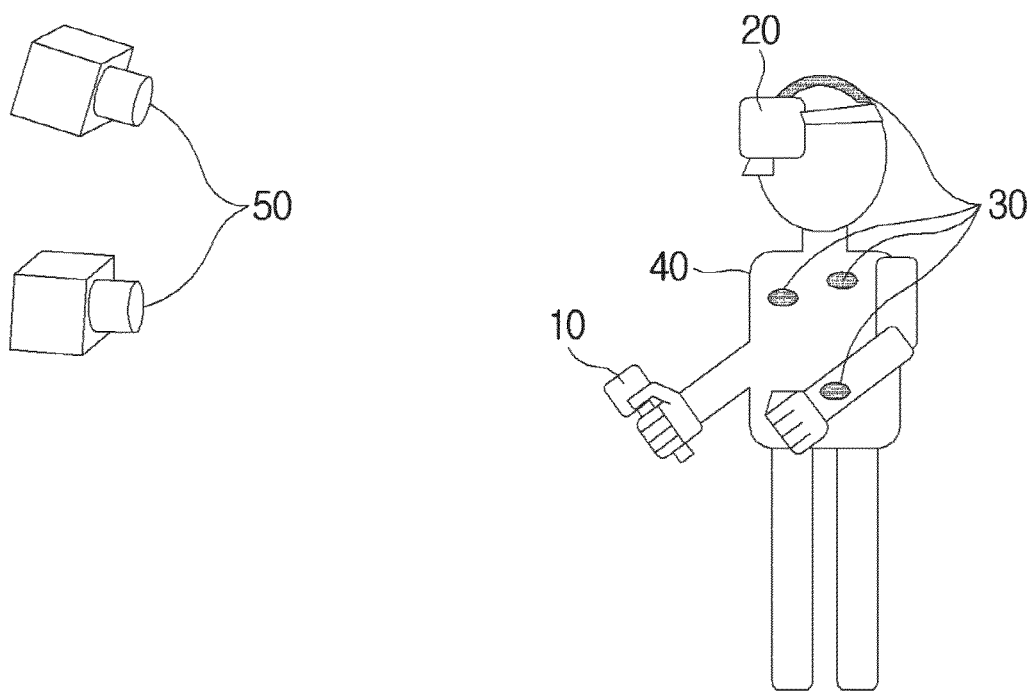

[FIG. 2]
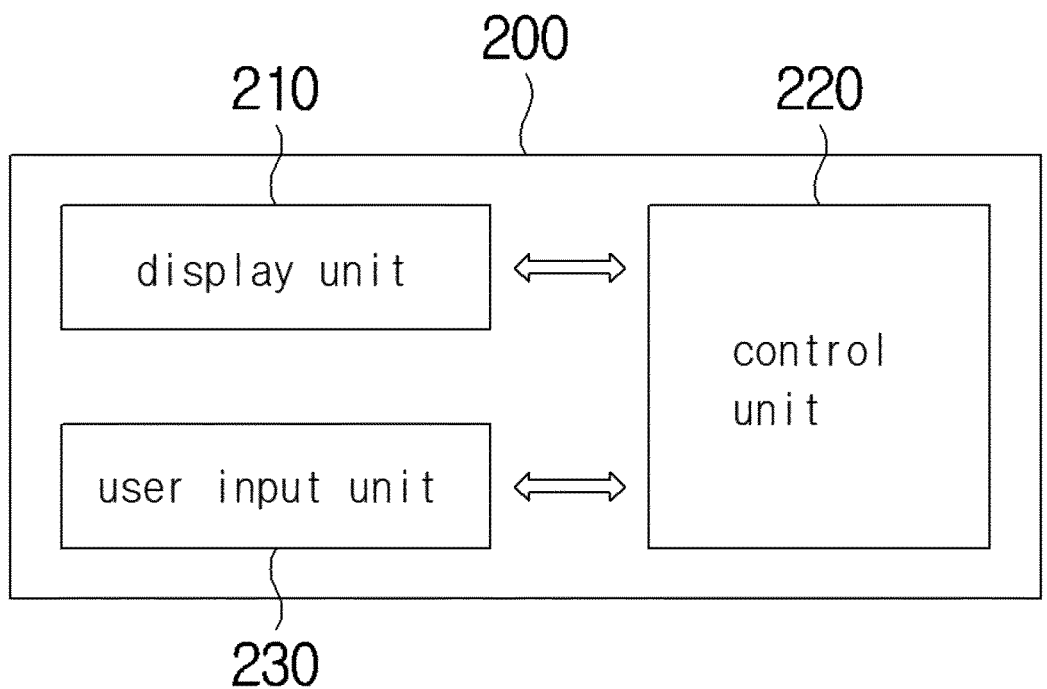

[FIG. 3]
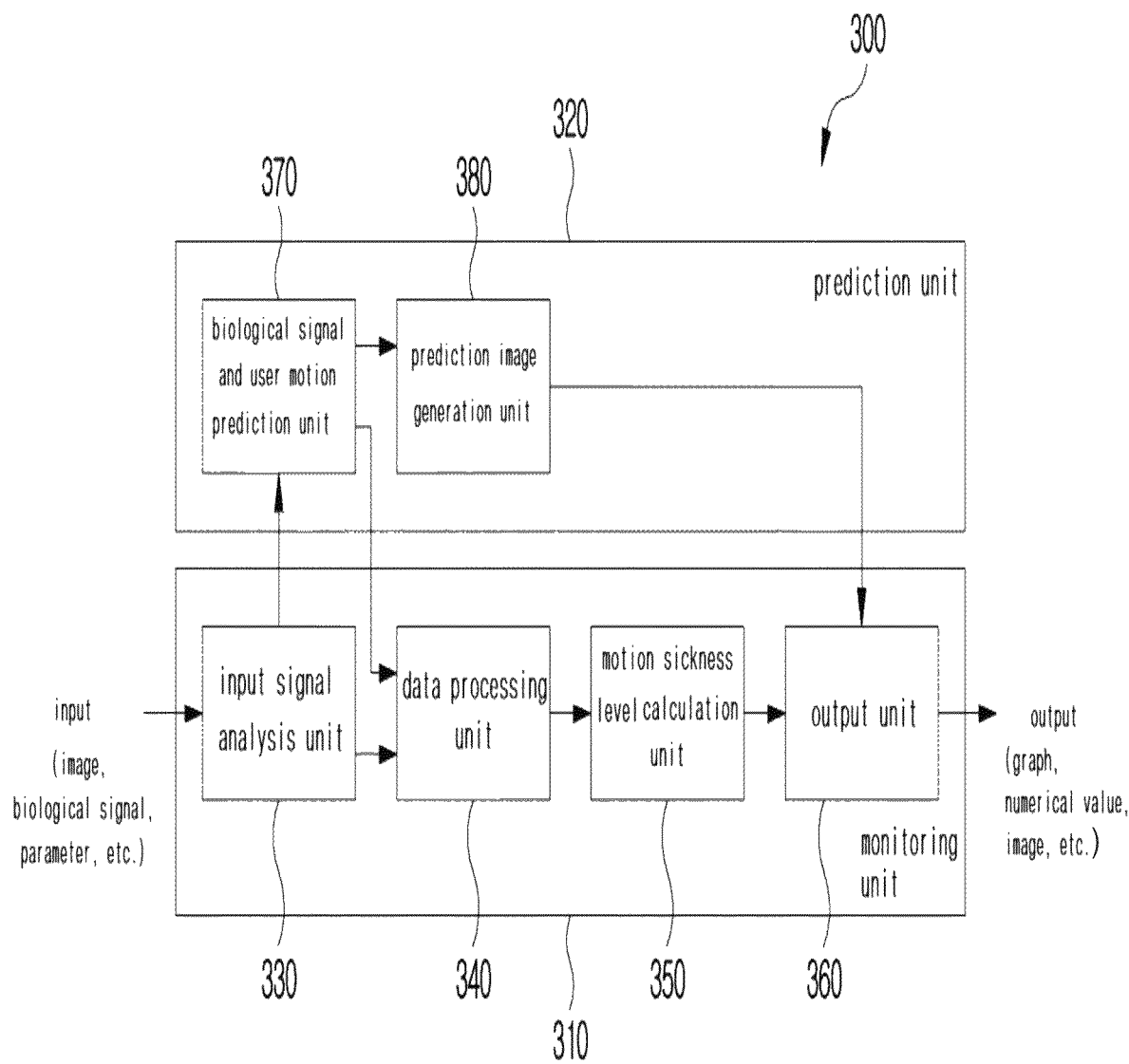

[FIG. 4]
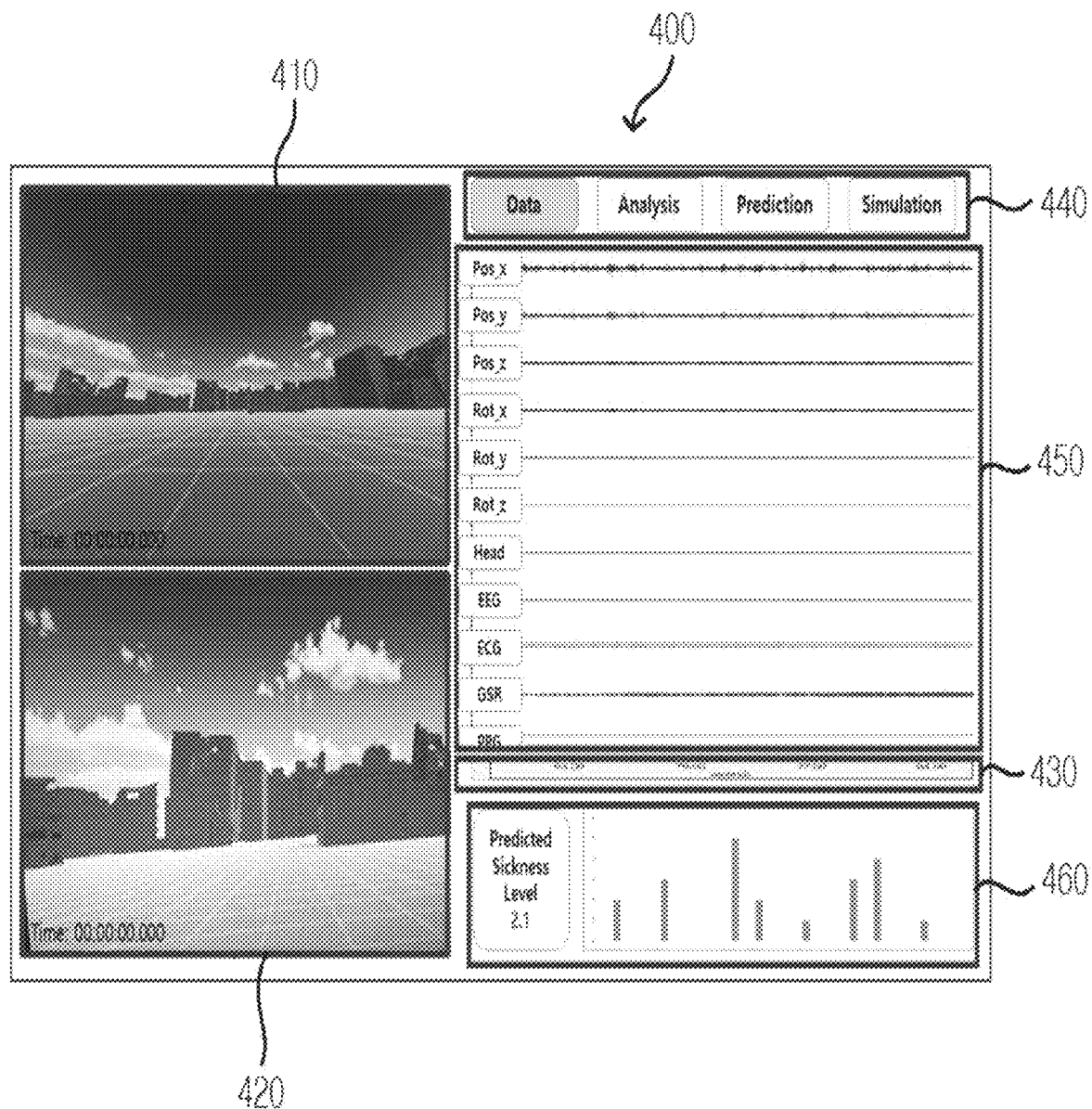

[FIG. 5]
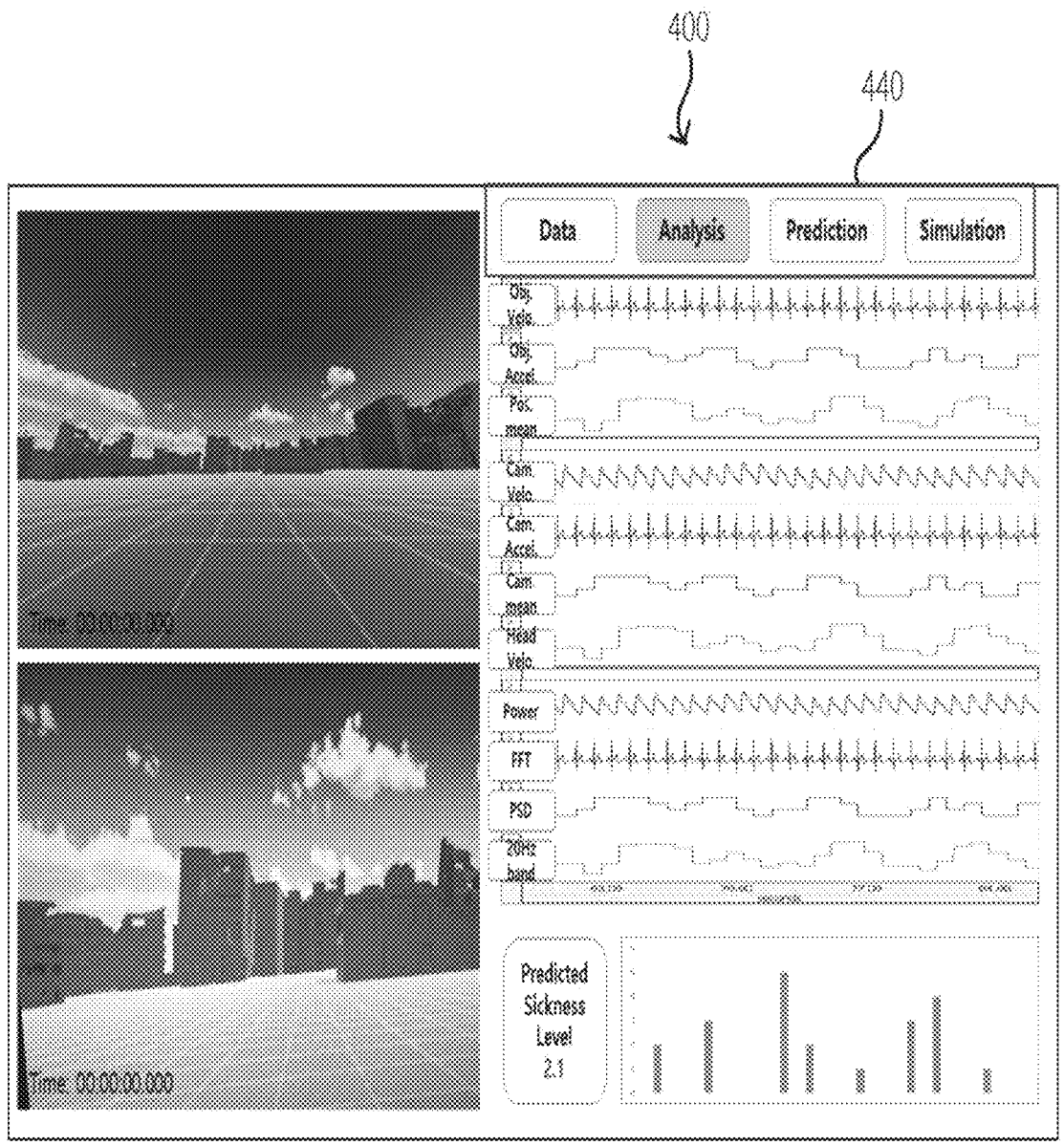

[FIG. 6]
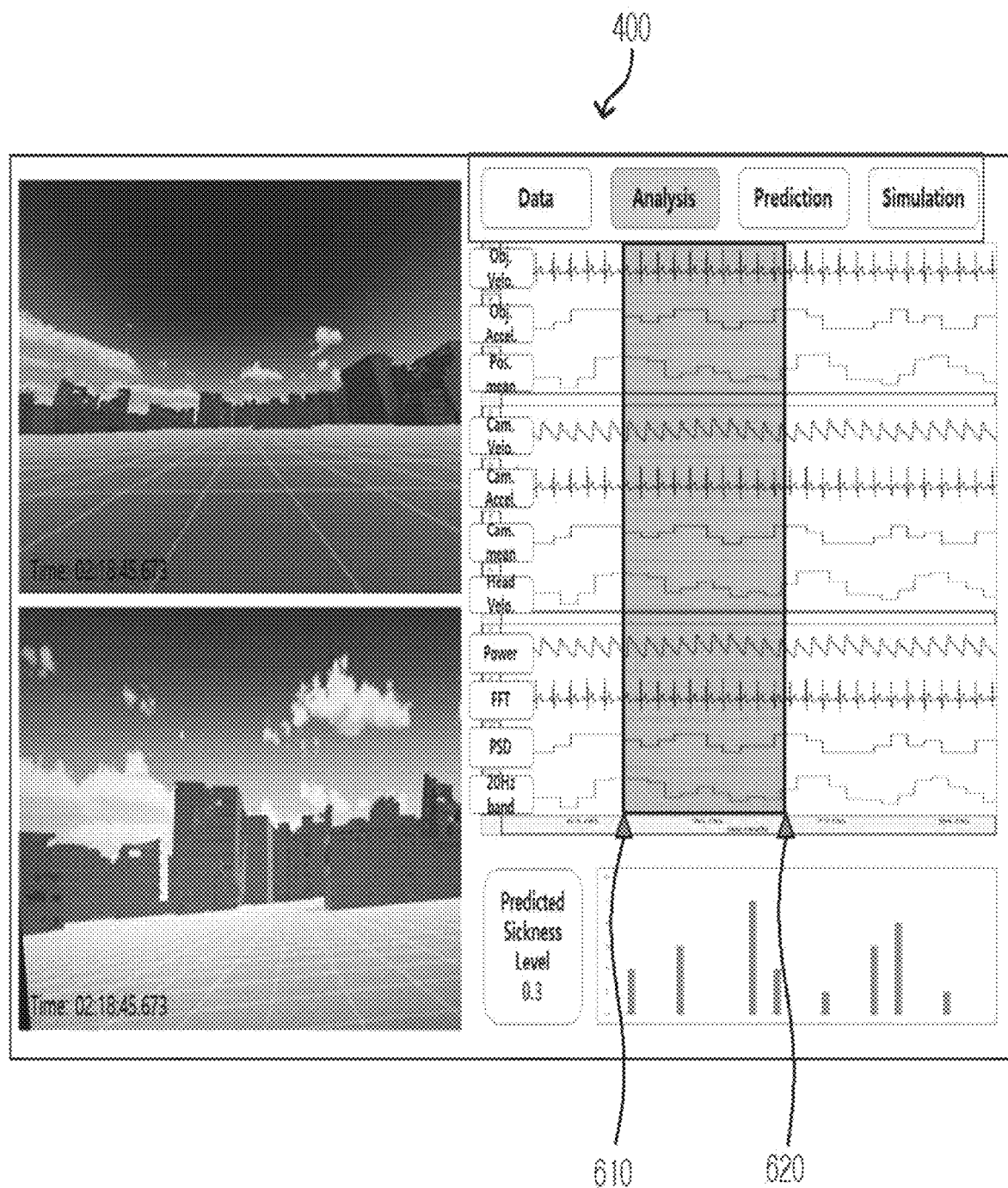

[FIG. 7]
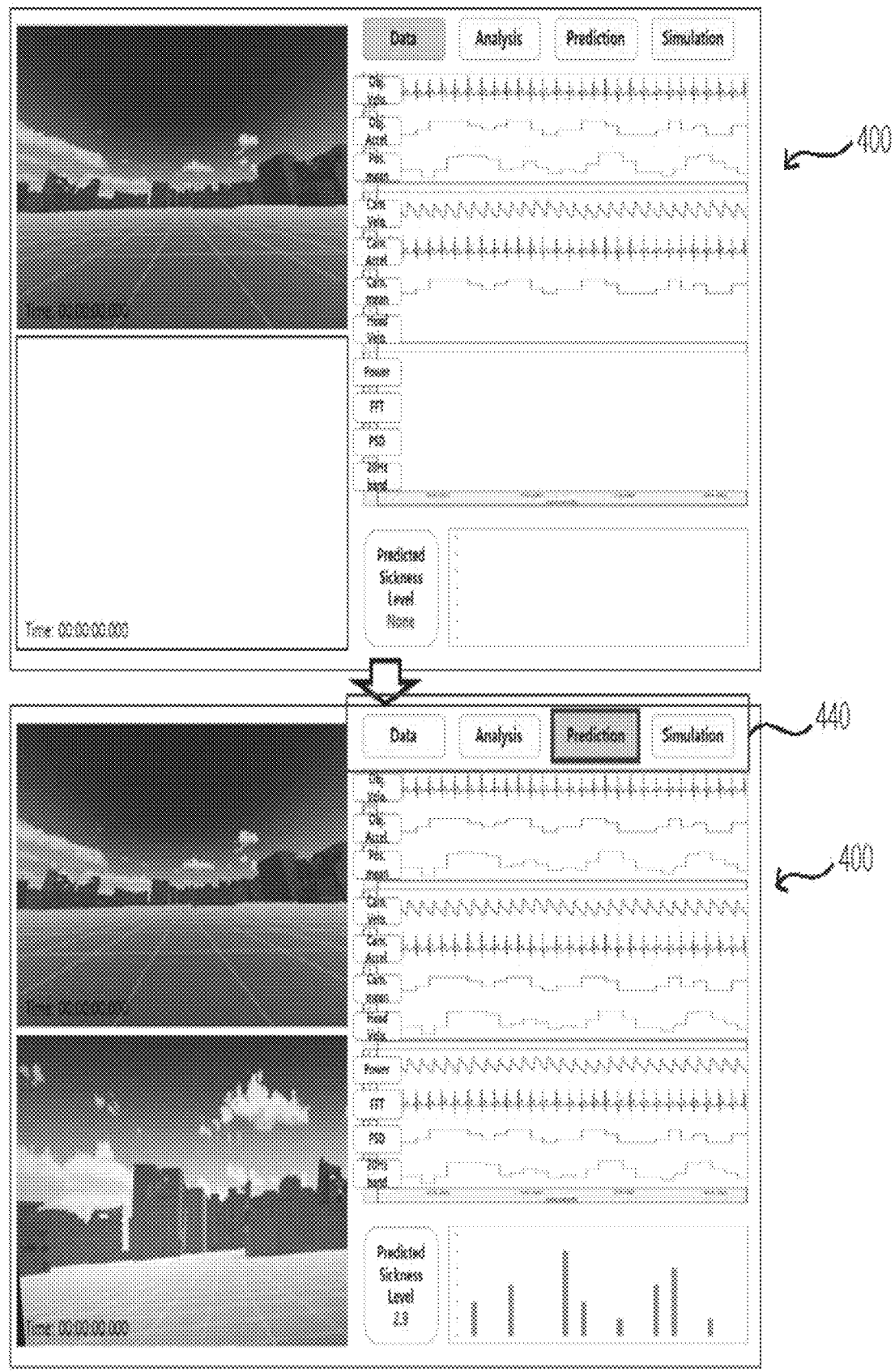

[FIG. 8]
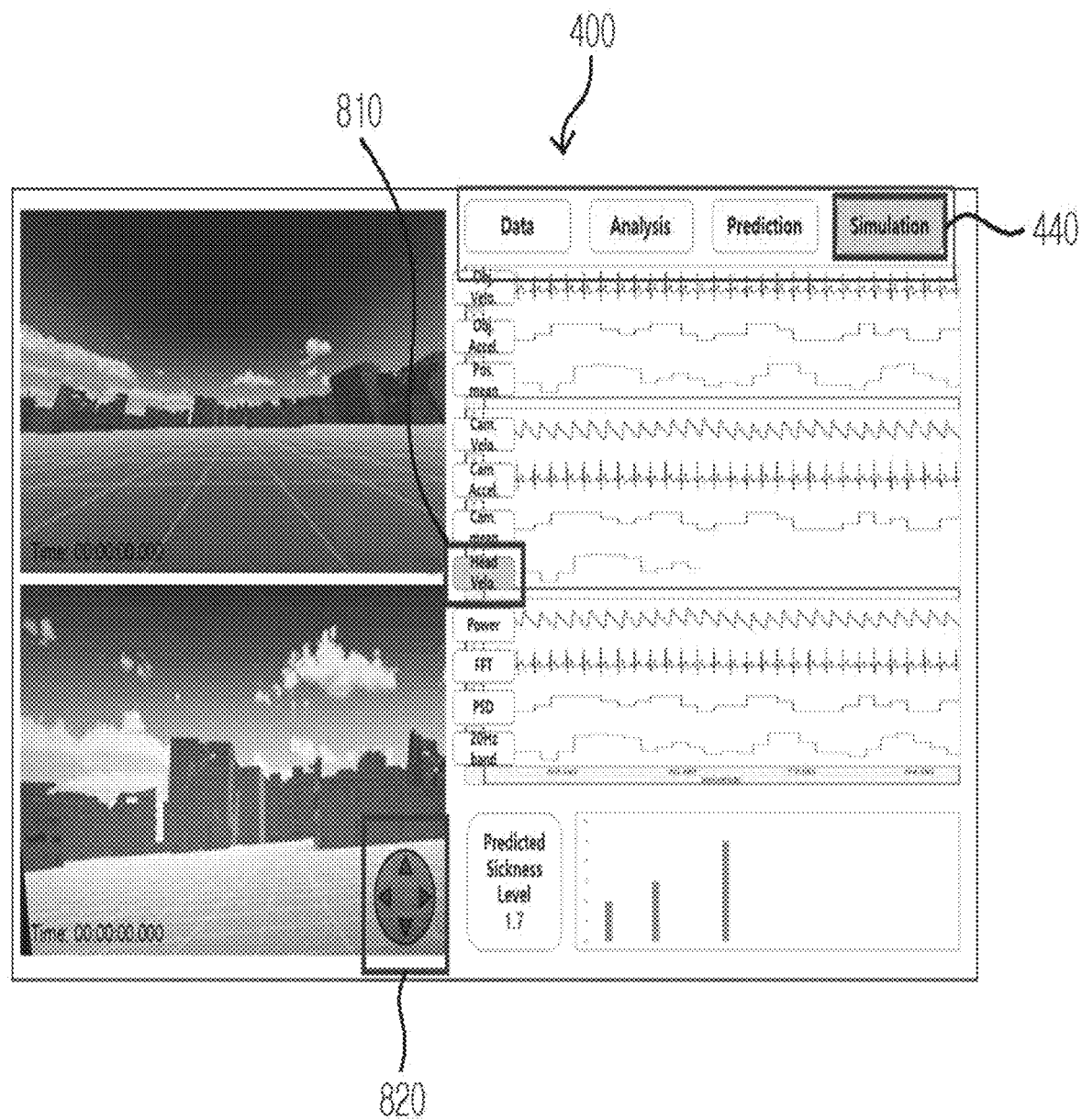

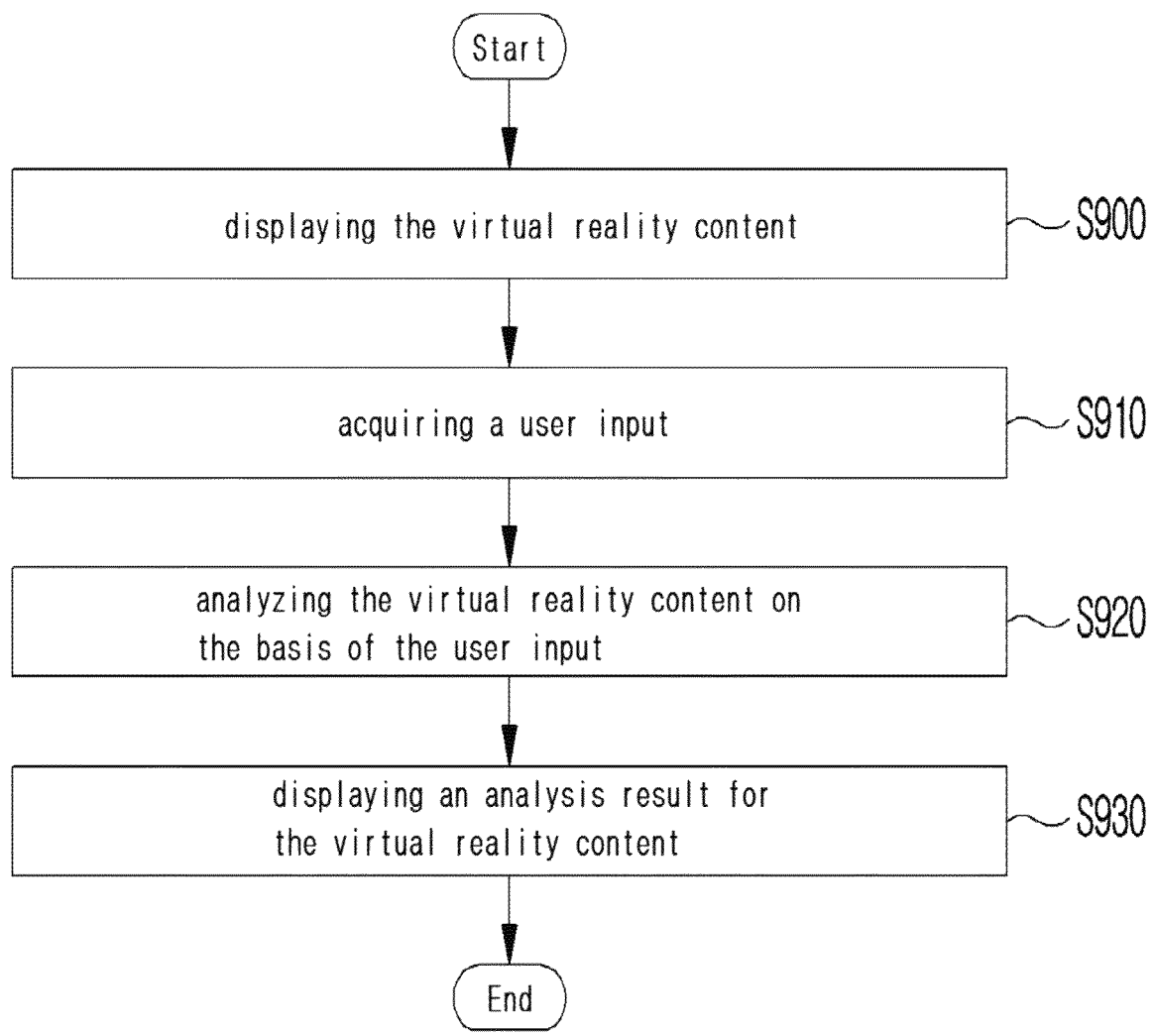

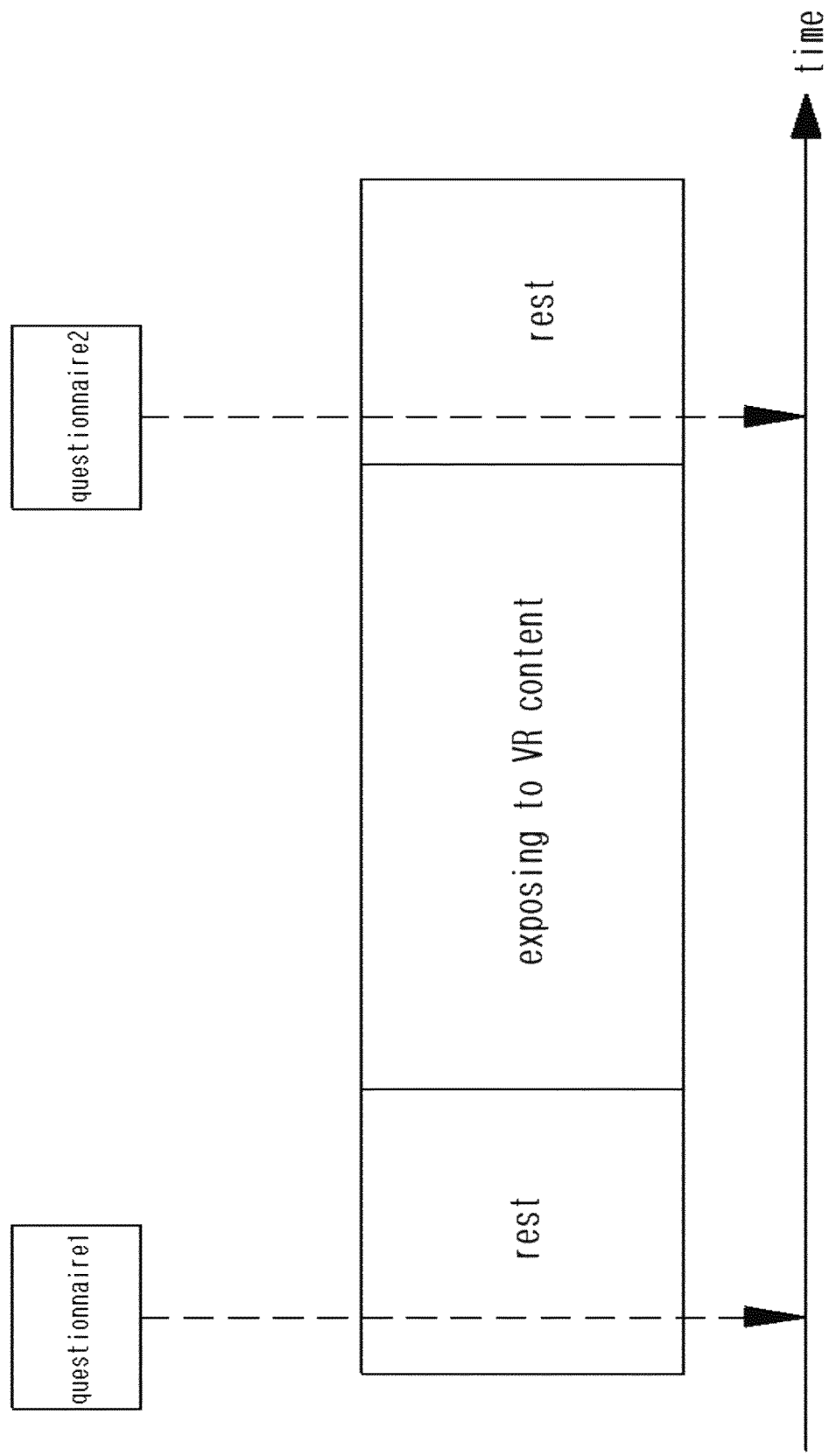
[FIG. 10]

[FIG. 11]
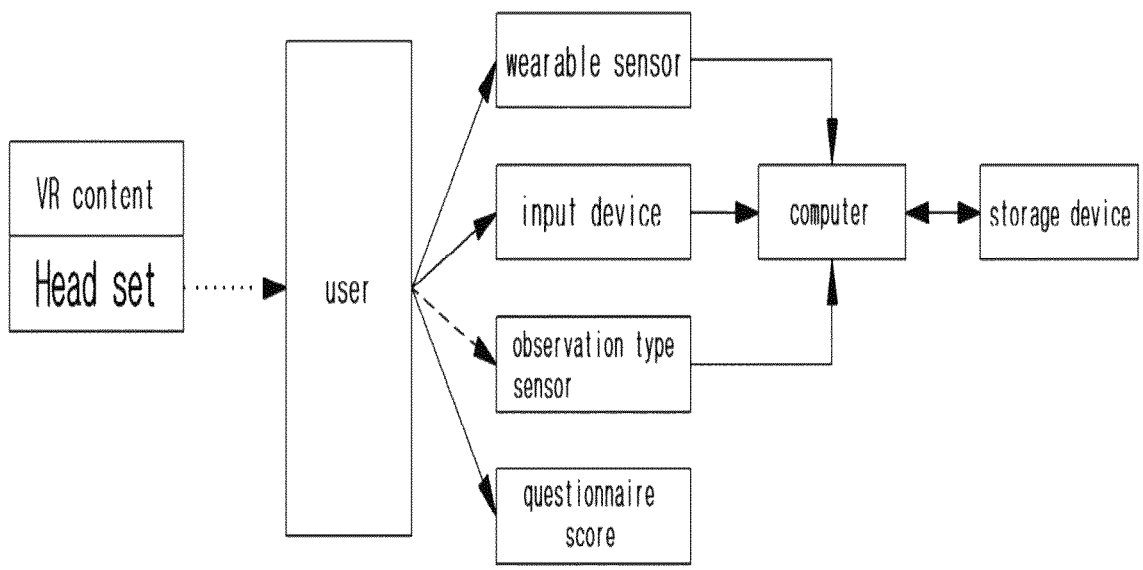
[FIG. 12]
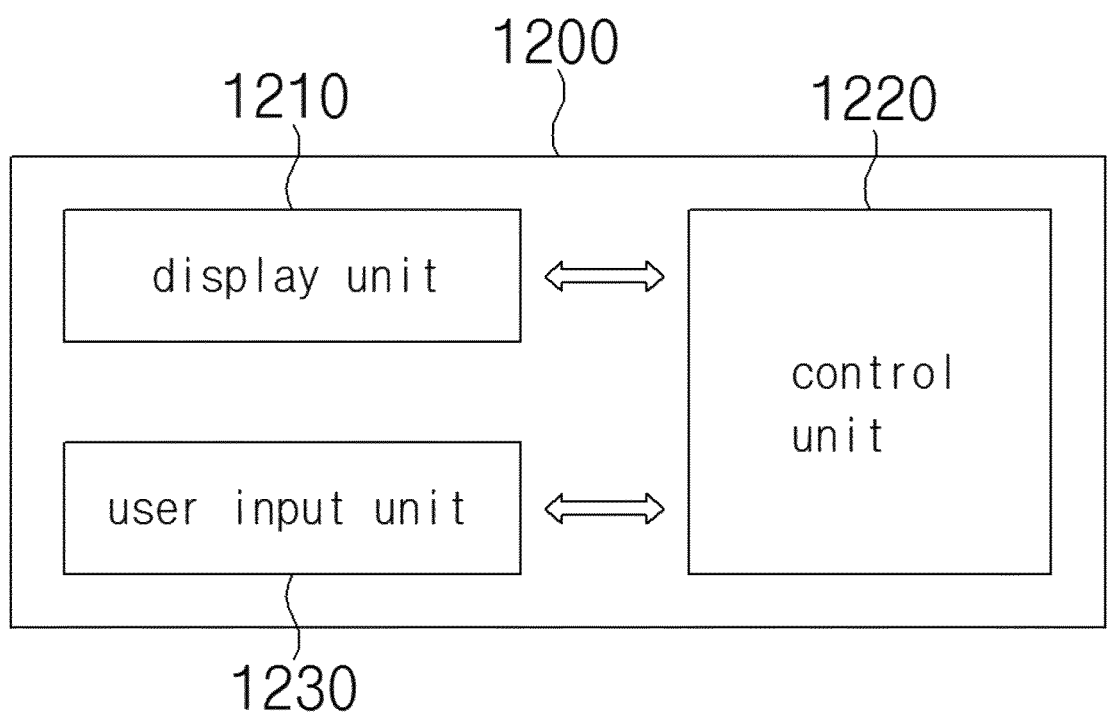

[FIG. 13]
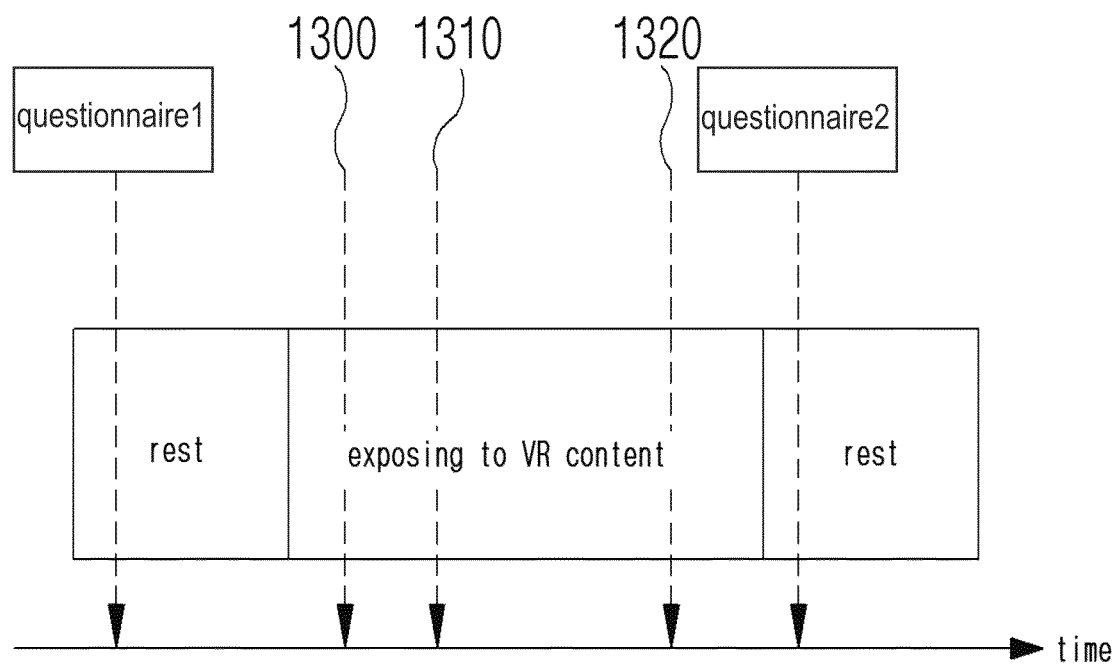
[FIG. 14]
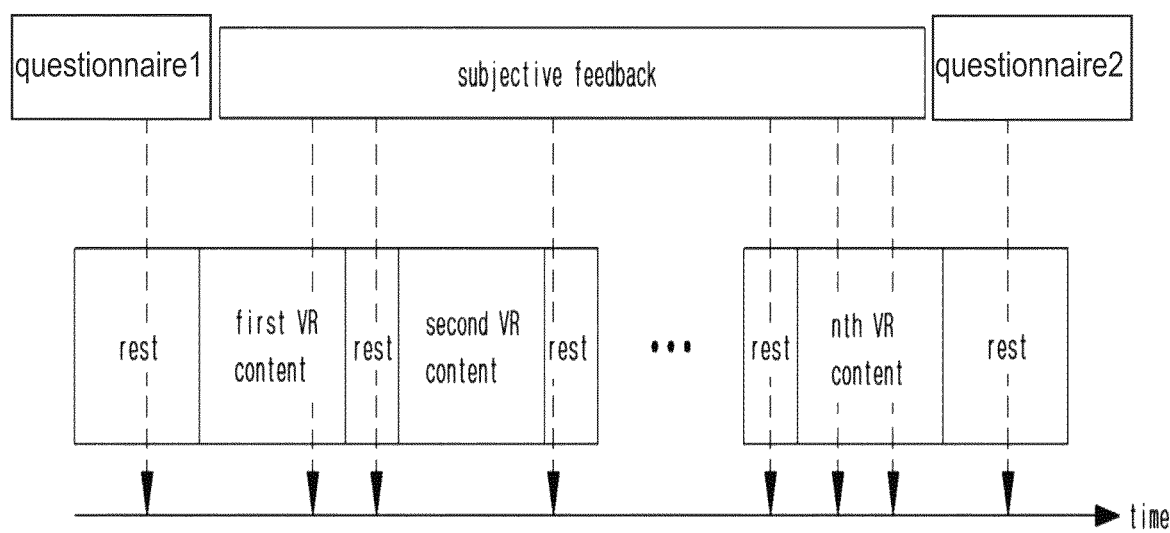

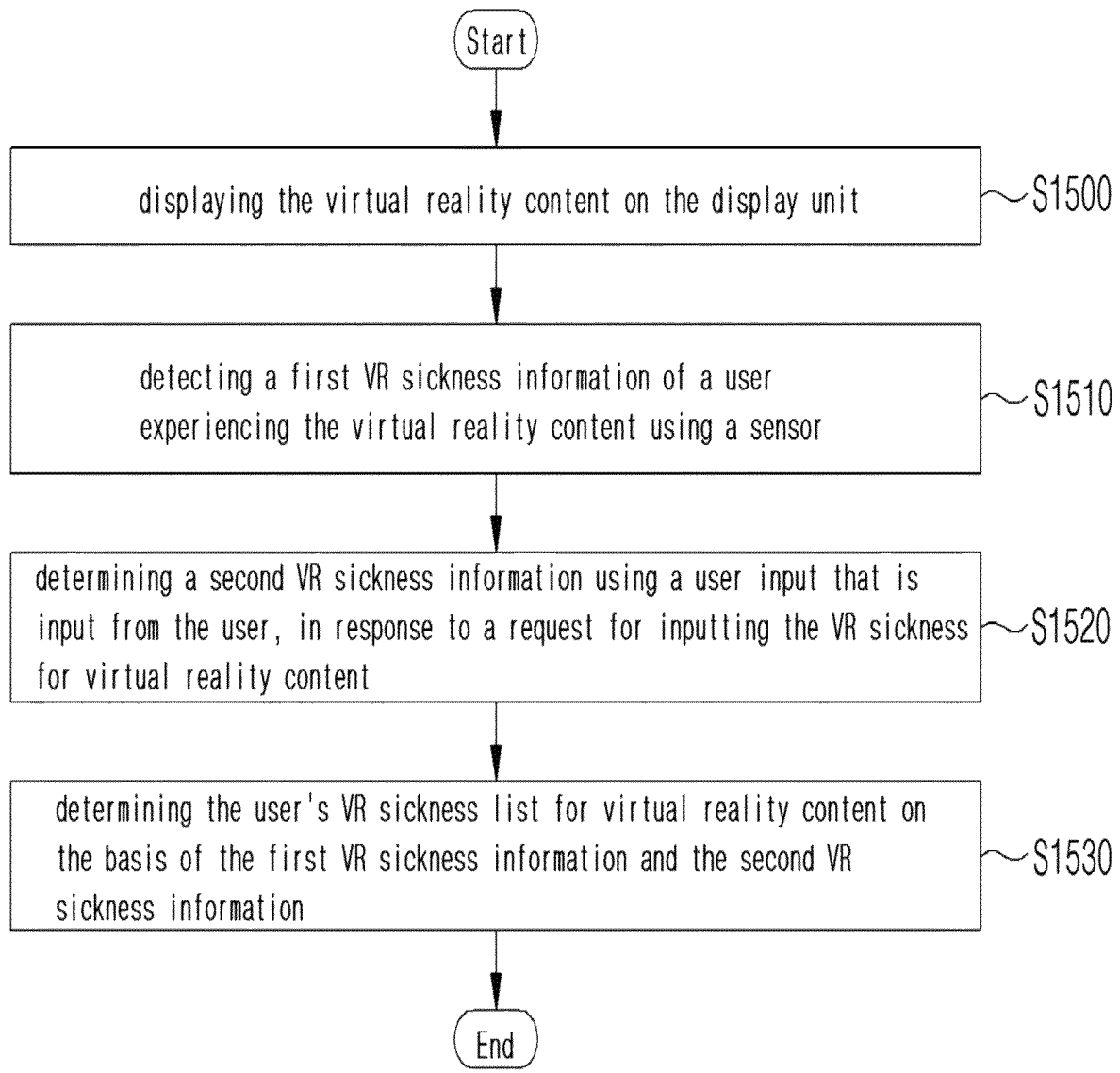
[FIG. 15]

APPARATUS AND METHOD OF MONITORING VR SICKNESS PREDICTION MODEL FOR VIRTUAL REALITY CONTENT

CROSS REFERENCE TO RELATED APPLICATION

The present application claims priority to Korean Patent Application Nos. 10-2017-0166133 filed Dec. 5, 2017, and 10-2017-0166135, filed Dec. 5, 2017, the entire contents of which is incorporated herein for all purposes by this reference.

BACKGROUND OF THE INVENTION

Field of the Invention

The present disclosure relates generally to an apparatus and a method of monitoring a VR (Virtual Reality) sickness (or motion sickness) prediction model for virtual reality content, whereby data is provided for the virtual reality content according to a purpose of a user. More particularly, the present disclosure relates to an apparatus and a method of visually monitoring a correlation model between VR sickness inducing-factors of virtual reality content acquired by performing machine learning based on supervised learning and VR sickness for virtual reality content.

Description of the Related Art

VR technology is a high technology that dynamically reproduces, through a virtual environment, a real situation which is accompanied with cost, time, or risk in order to construct a real environment. The VR technology has various applications, such as being used for purposes of training in various application fields such as national defense, medical, production, etc., or being applied to entertainment fields such as games, theme parks, and movies. In recent years, as head-mounted displays (HMDs) have become widespread in popularity, the availability of virtual reality technology is increasing.

However, viewing the VR content through the HMD device or the like can cause inconsistency between visual information acquired from the user's eyes and information of other sensory organs due to the virtual experience that is forced to be recognized by the user, whereby the inconsistency causes VR sickness such as motion sickness, etc., which results in serious safety hazards to users. Accordingly, content creators or service providers need to monitor the degree of VR sickness caused by the VR content and the quantitative/objective/visual information on the VR sickness-inducing factors in real time, thereby recognizing the risk that may occur to the user, providing appropriate content service to ensure user safety, and promoting the market expandability thereof. Users also need to intuitively attentive to motion sickness, thereby being aware of the risks and preventing excessive exposure to VR content.

Nevertheless, motion sickness/fatigue occurring in the current VR environment has been analyzed as subjective and limited techniques. For example, in the case of the clinical field including neurology, although monitoring is performed using various biomarkers in order to understand the details of VR motion sickness inducing factors, there are problems in that it is necessary to install additional equipment to acquire a biological signal, and it is difficult to predict the cause of motion sickness for given VR content. In addition, the subjective opinion of the user about the motion sickness collected through questionnaire is difficult to predict, and the standard thereof is ambiguous, whereby there is a problem in providing the safe VR service.

SUMMARY OF THE INVENTION

Accordingly, the present invention has been made keeping in mind the above problems occurring in the prior art, and an object of the present invention is to provide an apparatus and a method of visually monitoring a correlation model between VR sickness inducing-factors of virtual reality content acquired by performing machine learning based on supervised learning and VR sickness for virtual reality content.

The technical objects to be achieved by the present disclosure are not limited to the technical matters mentioned above, and other technical subjects that are not mentioned are to be clearly understood by those skilled in the art from the following description.

In order to achieve the above object, according to one aspect of the present invention, there is provided an apparatus for monitoring a VR (Virtual Reality) sickness prediction model for virtual reality content, the apparatus comprising: a display unit displaying the virtual reality content; a user input unit acquiring a user input; and a control unit performing control such that the virtual reality content is analyzed on a basis of the acquired user input and an analysis result for the virtual reality content is displayed on the display unit.

According to another aspect of the present disclosure, there is provided a method of monitoring a VR (Virtual Reality) sickness prediction model for virtual reality content, the method comprising: displaying the virtual reality content on a display unit; acquiring an user input; analyzing the virtual reality content on a basis of the acquired user input; and displaying an analysis result for the virtual reality content on the display unit.

It is to be understood that the foregoing summarized features are exemplary aspects of the following detailed description of the present invention without limiting the scope of the present invention.

According to the present disclosure, it is possible to provide an apparatus and a method of visually monitoring a correlation model between VR sickness-inducing factors of virtual reality content acquired by performing machine learning based on supervised learning and VR sickness for virtual reality content.

In addition, according to the present disclosure, since subjective experience such as motion sickness/fatigue that may occur when experiencing the virtual reality content is objectively and quantitatively expressed, potential risk factors can be eliminated and the user's body comfort can be guaranteed.

In addition, according to the present disclosure, information (e.g., object movement, camera movement, biological signal, head motion, VR sickness, etc.) associated with a user experiencing the virtual reality content through an image display device such as HMD device is analyzed in real time, whereby the corresponding analysis information can be provided as an effective guideline to content providers and producers.

In addition, according to the present disclosure, various information related to a given virtual reality image content can be predicted without actually using an HMD device or a bio-signal detection sensor.

The effects obtainable from the present disclosure are not limited to the effects mentioned above, and it will be clearly appreciated that other effects not mentioned can be clearly understood by those skilled in the art from the description below.

BRIEF DESCRIPTION OF THE DRAWINGS

The above and other objects, features and other advantages of the present invention will be more clearly understood from the following detailed description when taken in conjunction with the accompanying drawings, in which:

FIG. 1 is a view illustrating a system for acquiring VR sickness information of virtual reality content using a sensor and a user input according to an embodiment;

FIGS. 2 and 3 are block diagrams showing a configuration of a VR sickness prediction model monitoring apparatus for virtual reality content according to an embodiment;

FIG. 4 is a view showing a screen displayed by the VR sickness prediction model monitoring apparatus for virtual reality content when a user input is an input selected to display a first data related to the virtual reality content according to an embodiment;

FIG. 5 is a view showing a screen displayed by the VR sickness prediction model monitoring apparatus for virtual reality content when a user input is an input selected to display a second data acquired by processing the first data according to an embodiment;

FIG. 6 is a view showing an analysis result for virtual reality content at a playback section determined on the basis of a user input on a screen of the VR sickness prediction model monitoring apparatus for virtual reality content according to an embodiment;

FIG. 7 is a view showing a screen displayed by the VR sickness prediction model monitoring apparatus for virtual reality content when a user input is an input selected to display a prediction image for the second virtual reality content according to an exemplary embodiment;

FIG. 8 is a view showing a screen displayed by the VR sickness prediction model monitoring apparatus for virtual reality content when a user input is an input selected to display a simulation result for the virtual reality content according to an embodiment;

FIG. 9 is a flowchart illustrating an operation method of a VR sickness prediction model monitoring apparatus for virtual reality content according to an embodiment;

FIG. 10 is a view illustrating a process of measuring subjective VR sickness for virtual reality content in the related art;

FIG. 11 is a view illustrating a system for analyzing VR sickness for virtual reality content using a sensor and user input according to an embodiment;

FIG. 12 is a block diagram illustrating a configuration of a VR sickness analysis apparatus for virtual reality content according to an embodiment;

FIG. 13 is a view illustrating a process of determining subjective VR sickness by the VR sickness analysis apparatus for virtual reality content according to an embodiment;

FIG. 14 is a view illustrating a process of determining subjective VR sickness by the VR sickness analysis apparatus for virtual reality content according to another embodiment; and FIG. 15 is a flowchart illustrating an operation method of a VR sickness analysis apparatus for virtual reality content according to an embodiment.

DETAILED DESCRIPTION OF THE INVENTION

Hereinafter, embodiments of the present disclosure will be described in detail with reference to the accompanying drawings so that those skilled in the art can easily carry out the present disclosure. However, the present disclosure may be embodied in many different forms and is not limited to the embodiments described herein.

In the following description of the embodiments of the present disclosure, a detailed description of known functions and configurations incorporated herein will be omitted when it may make the subject matter of the present disclosure rather unclear. Parts not related to the description of the present disclosure in the drawings are omitted, and like parts are denoted by similar reference numerals.

In the present disclosure, when a component is referred to as being "connected" or "coupled" to another component, the component may be directly connected or coupled to the another component, but it is to be understood that there may be other components in between. Also, when a component is referred to as "comprising" or "having" another component, it is appreciated that this is not to exclude other elements but to further include any other elements unless explicitly mentioned to the contrary.

In the present disclosure, the terms first, second, etc. are used only for the purpose of distinguishing one component from another, and do not limit the order or importance of the components unless specifically mentioned. Thus, within the scope of this disclosure, a first component in one embodiment may be referred to as a second component in another embodiment, and similarly a second component in one embodiment may be referred to as a second component in another embodiment.

In the present disclosure, components that are distinguished from each other are intended to clearly illustrate each feature and do not necessarily mean that components are separate. That is, a plurality of components may be integrated into one hardware or software unit, or a single component may be distributed into a plurality of hardware or software units. Accordingly, such integrated or distributed embodiments are also included within the scope of the present disclosure, unless otherwise noted.

In the present disclosure, the components described in the various embodiments do not necessarily mean essential components, and some may be optional components. Accordingly, embodiments consisting of a subset of the components described in one embodiment are also included within the scope of this disclosure. Also, embodiments that include other components in addition to the components described in the various embodiments are also included in the scope of the present disclosure.

Hereinafter, embodiments of the present disclosure will be described with reference to the accompanying drawings.

FIG. 1 is a view illustrating a system for acquiring VR sickness information of virtual reality content using a sensor and a user input according to an embodiment.

A VR sickness prediction model monitoring apparatus for virtual reality content according to an embodiment may display virtual reality content on a display, detect a first VR sickness information of a user experiencing the virtual reality content using a sensor, and determine a second VR sickness information using a user input that is input from the user in response to a request for inputting a degree of VR sickness for the virtual reality content.

A sensor according to an embodiment may include an image capturing sensor (or observation type sensor) or a biological signal detection sensor (or a wearable sensor).

Referring to FIG. 1, when a user 40 wearing a video display device 20 such as a head mounted display (HMD) is experiencing virtual reality content displayed on the video display device 20, the VR sickness prediction model monitoring apparatus may track changes in the posture, the state, the pupils, the facial expression, the gesture, and the voice of the user 40 using an observation type sensor 50. According to an embodiment, the observation type sensor 50 may include, but is not limited to, an MRI, an FMRI, an image sensor, an infrared sensor, and the like, and may include a sensor that is capable of tracking a change in user's behavior. In addition, the VR sickness prediction model monitoring apparatus includes a sensor capable of detecting a biological signal such as an electroencephalogram EEG, an electrocardiogram ECG, picopicogram PPG, galvanic skin response GSR, and a vomiting measurement of the user 40 using a wearable sensor 30. An image of the user acquired from the image capturing sensor or the magnitude of a biological signal of the user acquired from the biological signal detection sensor may be referred to as the first VR sickness information (or objective VR sickness information). Also, according to an embodiment, the VR sickness prediction model monitoring apparatus may acquire a feature vector for performing machine learning on the basis of the first VR sickness information, and for example, the first VR sickness information may be extracted on the time axis and thus generated as a feature vector form.

Also, the VR sickness prediction model monitoring apparatus may receive a degree of VR sickness from the user in response to a request for inputting the degree of the VR sickness for the virtual reality content before/after or during providing (or exposing) the virtual reality content to the user. The request for inputting the degree of the VR sickness for the virtual reality content according to an embodiment may be issued to the user at a predetermined time interval. In addition, the user input according to an embodiment may be an input through a user interface displayed on the display unit or an input from an input device equipped with the VR sickness prediction model monitoring apparatus. In addition, the virtual reality content according to an embodiment may be a set of a plurality of individual virtual reality contents in which each value of VR sickness-inducing factors is controlled. On the other hand, the information acquired from the user in response to the request for inputting the degree of the VR sickness for the virtual reality content is referred to as the second VR sickness information (or subjective VR sickness information), which will be described later.

According to an embodiment, the VR sickness prediction model monitoring apparatus is capable of performing machine learning based on supervised learning using the VR sickness-inducing factors of the virtual reality content, the first VR sickness information, and the second VR sickness information, and determining a correlation between the VR sickness-inducing factors and a VR sickness list on the basis of a result of the performed machine learning. For example, the VR sickness prediction model monitoring apparatus may cause VR sickness list items to be changed in magnitude, as values of the VR sickness-inducing factors of the virtual reality content change.

According to an embodiment, the VR sickness-inducing factors (or VR human factor parameters) may include, but are not limited to, movement of a camera, movement of an object, playback information, resolution, binocular parallax, depth of field, angle of view, image feature, special effect, and texture effect, and may further include factors capable of causing VR sickness such as motion sickness to a user experiencing the virtual reality content, such as a change in intrinsic characteristics of the content or extrinsic characteristics of the content (for example, movement of an object, movement of a camera).

According to an embodiment, a user's VR sickness list (or VR motion sickness symptoms) for the virtual reality content is information including the VR sickness list items and the magnitude of each of the items for the corresponding virtual reality content and user, and the VR sickness list items according to the embodiments may include, but are not limited to, discomfort, fatigue, headache, eye fatigue, difficulties with focusing, sweating, nausea, difficulties with attention, brain fog, visual acuity, dizziness, hallucinations, stomachache, cyber sickness, burping, or other symptoms, and may further include specific symptoms that may be caused by experiencing the virtual reality content.

Meanwhile, the second VR sickness information according to an embodiment may be the degrees of the VR sickness list items that are input from the user in response to a request for inputting the degree of the VR sickness for the virtual reality content. For example, the VR sickness prediction model monitoring apparatus may acquire the degree of each of items such as headache, nausea, and dizziness input from the user in response to the request for inputting the degree of the VR sickness while experiencing the virtual reality content called A. In addition, the second VR sickness information according to an embodiment may be input through a user interface displayed on the display unit or from an input device equipped with the VR sickness prediction model monitoring apparatus, or acquired using the result of writing a simulation sickness questionnaire. According to an embodiment, the input device equipped with the VR sickness prediction model monitoring apparatus may be a user interface tool such as a controller, but is not limited thereto.

In addition, the VR sickness prediction model monitoring apparatus according to an embodiment determines a feature vector acquired using the first VR sickness information as data in the machine learning based on supervised learning, determines the second VR sickness information as a label for the data in the machine learning based on supervised learning, and performs the machine learning based on supervised learning using the data and the label for the data. In addition, the VR sickness prediction model monitoring apparatus according to an embodiment may predict a correlation between the VR sickness-inducing factors for any virtual reality content and the VR sickness list on the basis of the machine learning result.

In addition, the VR sickness prediction model monitoring apparatus according to an embodiment may display the virtual reality content, analyze the virtual reality content based on the acquired user input, and display a result of analyzing the virtual reality content.

Meanwhile, the virtual reality content according to an embodiment may be first virtual reality content that is produced in advance or second virtual reality content displayed on an HMD device worn by a user as an image corresponding to the first virtual reality content.

Meanwhile, the user input according to an embodiment may include an input to select a playback time of the virtual reality content. In addition, the user input according to an embodiment may include a first data related to the virtual reality content, a second data acquired by processing the first data, and an input selected so that prediction image on the second virtual reality content or a simulation result on the virtual reality content are displayed on a display unit.

Meanwhile, the first data according to an embodiment may include the VR sickness inducing-factors of the virtual reality content, the first VR sickness information, the second VR sickness information, or the correlation between the VR sickness-inducing factors determined in advance via machine learning and the VR sickness list.

In addition, when the user input is an input to select a playback time of the virtual reality content, the VR sickness prediction model monitoring apparatus according to an embodiment may display a result of analyzing the virtual reality content at a playback section corresponding to the playback time.

In addition, when the user input is an input selected to display the first data related to the virtual reality content, the VR sickness prediction model monitoring apparatus according to an embodiment may perform control such that the virtual reality content is analyzed, thereby displaying the VR sickness inducing-factors of the virtual reality content, the first VR sickness information, the second VR sickness information, or the correlation between VR sickness-inducing factors determined in advance via machine learning and a VR sickness list.

Also, when the user input is an input selected to display the second data, the VR sickness prediction model monitoring apparatus according to an embodiment may substitute a part of the first data for one of the VR sickness inducing-factors and then display a result of the substitution so that the user may confirm the VR sickness information more easily.

Also, when the user input is an input selected to display a prediction image for the second virtual reality content, the VR sickness prediction model monitoring apparatus according to an embodiment may analyze the first virtual reality content or the first data, thereby determining a prediction image for the second virtual reality content and displaying the determined image.

Also, when the user input is an input selected to display a simulation result for the virtual reality content, the VR sickness prediction model monitoring apparatus according to an embodiment may change values of the VR sickness list items and display the changed VR sickness list using a graphical user interface (GUI), as the user input is additionally acquired in order to change the values of VR sickness-inducing factors.

FIGS. 2 and 3 are block diagrams showing a configuration of a VR sickness prediction model monitoring apparatus for virtual reality content according to an embodiment.

Referring to FIG. 2, the VR sickness prediction model monitoring apparatus 200 for virtual reality content according to an embodiment may include a display unit 210, a control unit 220, and a user input unit 230. It should be noted, however, that this is only illustrative of some of the components necessary for explaining the present embodiment, and components included in the VR sickness prediction model monitoring apparatus 200 are not limited to the examples described above.

For example, referring to FIG. 3, the VR sickness prediction model monitoring apparatus 300 may further include a monitoring unit 310 and a prediction unit 320. Further, according to an embodiment, the monitoring unit 310 may include an input signal analysis unit 330, a data processing unit 340, a motion sickness level calculation unit 350, and an output unit 360, and the prediction unit 320 may include a biological signal and user motion prediction unit 370 and a prediction image generation unit 380. The VR sickness prediction model monitoring apparatus 300 of FIG. 3 may correspond to the VR sickness prediction model monitoring apparatus 200 of FIG. 2.

Referring to FIG. 2, the display unit 210 converts a video signal, a data signal, an OSD signal, and a control signal processed in the control unit 220 to generate a driving signal. The display unit 210 may display content (e.g., moving picture) input through a communication unit or an input/output unit. The display unit 210 also outputs an image stored in a storage unit under the control of the control unit 220. In addition, the display unit 210 displays a voice user interface UI (for example, including voice command guide) for performing voice recognition task corresponding to voice recognition or a motion user interface UI (for example, including user motion guide for motion recognition) for performing motion recognition task corresponding to motion recognition. Also, the display unit 210 may display and output information processed by the VR sickness prediction model monitoring apparatus 200. For example, the display unit 210 may display a virtual image, a user interface for selecting the virtual image, or a user interface for setting an operation of the virtual image. The display unit 210 may also display information processed in an HMD device or an external immersive virtual reality imaging device. The display unit 210 of FIG. 2 may include the output unit 360 of FIG. 3.

The display unit 210 according to an embodiment may display the virtual reality content.

Further, the display unit 210 according to an embodiment may display a correlation between a VR sickness list and VR sickness-inducing factors of virtual reality content determined by performing machine learning, using a GUI.

In addition, the display unit 210 according to an embodiment may display a result of analyzing the virtual reality content acquired on the basis of a user input. Specifically, on the basis of the user input performed to select a playback time of the virtual reality content, the display unit 210 may display the result for analyzing the virtual reality content at a playback section corresponding to the playback time. In addition, the display unit 210 analyzes the virtual reality content and then displays the VR sickness inducing-factors of the virtual reality content, the first VR sickness information, the second VR sickness information, or the correlation between the VR sickness list and the VR sickness-inducing factors of the virtual reality content determined by performing the machine learning, using a GUI. The controller 220 controls the overall operation of the VR sickness prediction model monitoring apparatus 200 for the virtual reality content and the signal flow between internal components of the VR sickness prediction model monitoring apparatus 200 for virtual reality content and performs a function of processing data. The control unit 220 may execute various applications stored in the storage unit when an input is performed by the user or a predefined condition is satisfied. The control unit 220 of FIG. 2 may include the input signal analysis unit 330, the data processing unit 340, the motion sickness level calculation unit 350, the biological signal and user motion prediction unit 370, and a prediction image generation unit 380 of FIG. 3. However, only partial components necessary for explaining the present embodiment are shown, and the components included in the control unit 220 are not limited to the above-described examples.

The control unit 220 according to an embodiment detects the first VR sickness information of a user experiencing the virtual reality content using a sensor and generates a user input unit 230; determines the second VR sickness information using a user input that is input to the user input unit 230 in response to a request for inputting a degree of VR sickness for the virtual reality content; performs the machine learning based on supervised learning using the VR sickness-inducing factors of the virtual reality content, the first VR sickness information, and the second VR sickness information; and determines the correlation between the VR sickness-inducing factors and the VR sickness list on the basis of a result of the performed machine learning.

Further, the control unit 220 according to an embodiment causes VR sickness list items to be changed in magnitude, as values of the VR sickness-inducing factors of the virtual reality content change.

In addition, the control unit 220 according to an embodiment determines a feature vector acquired using the first VR sickness information as data in the machine learning based on supervised learning; determines the second VR sickness information as a label for the data in the machine learning based on supervised learning; and performs the machine learning based on supervised learning using the data and the label for the data. In addition, the control unit 220 according to an embodiment may predict the correlation between the VR sickness-inducing factors for any virtual reality content and the VR sickness list on the basis of a result of the machine learning.

In addition, the control unit 220 according to an embodiment performs control such that the virtual reality content is analyzed on the basis of the user input and the analysis result for the virtual reality contents is displayed on the display unit 210.

In addition, when the user input is an input to select the playback time, the control unit 220 according to an embodiment performs control such that the analysis result for the virtual reality content is displayed on the display unit 210 at the playback section corresponding to the playback time.

In addition, when the user input is an input selected to display the first data related to the virtual reality content, the control unit 220 according to an embodiment performs control such that the virtual reality content is analyzed, thereby displaying the VR sickness inducing-factors of the virtual reality content, the first VR sickness information, the second VR sickness information, or the correlation information between the VR sickness inducing-factors determined in advance via machine learning and the VR sickness list, on the display unit 210.

Also, when the user input is an input selected to display the second data, the control unit 220 according to an embodiment performs control such that a part of the first data is substituted for one of the VR sickness inducing-factors and a result of the substitution is displayed so that the user may confirm the VR sickness information more easily.

Also, when the user input is selected to display the prediction image for the second virtual reality content, the control unit 220 according to an embodiment may perform control such that the first virtual reality content or the first data is analyzed, thereby determining the prediction image for the second virtual reality content and displaying the determined image on the display unit 210.

In addition, when the user input is an input selected to display the simulation result for the virtual reality content, the control unit 220 according to an embodiment may perform control such that values of the VR sickness list items are changed and the changed VR sickness list is displayed using a GUI, as the user input is additionally acquired in order to change the values of VR sickness-inducing factors.

The user input unit 230 is defined as a means for a user to input data for controlling the VR sickness prediction model monitoring apparatus 200 for the virtual reality content. For example, the user input unit 230 may include, but is not limited to, a keypad, a dome switch, a touchpad (contact capacitance method, pressure resistive membrane method, infrared sensing method, surface ultrasonic conductive method, integral tension measuring method, piezo effect method, etc.), a jog wheel, a jog switch, and the like.

The user input unit 230 according to an embodiment may receive a user input in response to a request for inputting a degree of VR sickness for the virtual reality content. The user input may also be an input through a user interface displayed on the display unit 210 or an input from an input device equipped with the VR sickness prediction model monitoring apparatus 200. According to an embodiment, the input device equipped with the VR sickness prediction model monitoring apparatus 200 may be a user interface tool such as a controller, but is not limited thereto.

Also, the user input unit 230 according to an embodiment may receive the user input to select the playback time of the virtual reality content. Also, the user input unit 230 according to an embodiment receives the user input selected to display a first data related to the virtual reality content, a second data acquired by processing the first data, a prediction image for the second virtual reality content, or a simulation result for the virtual reality content on the display unit.

As will be described below, the operation of a VR sickness prediction model monitoring apparatus 200 for the virtual reality content based on machine learning will be described with reference to FIG. 3.

The VR sickness prediction model monitoring apparatus 300 according to an embodiment may include a monitoring unit 310 and a prediction unit 320, in which the monitoring unit 310 may include an input signal analysis unit 330, a data processing unit 340, a motion sickness level calculation unit 350, and an output unit 360, and the prediction unit 320 may include a biological signal and user motion prediction unit 370 and a prediction image generation unit 380.

The VR sickness prediction model monitoring apparatus 300 according to an embodiment may provide a degree of VR sickness for virtual reality content (or motion sickness level), the VR sickness inducing-factors, or visual monitoring service for biological signal, and perform analysis and predict on the input image/signal according to a purpose of the user.

The monitoring unit 310 according to an embodiment visually displays information acquired by performing analysis and processing on the input image/signal. Specifically, the input signal analysis unit 330 determines whether or not there is data for determining the degree of VR sickness for virtual reality content from an input image, a biological signal, and parameter related to the input image and the biological signal, and then provides the corresponding data to the data processing unit 340 or the estimation unit 320. Further, the data processing unit 340 may process a feature point (or VR sickness inducing-factors) for calculating the motion sickness level using data related to the virtual reality content, and the motion sickness level calculation unit 350 derives the quantitative motion sickness level (or VR sickness list) predicted from the feature point (or the VR sickness inducing-factors) using the VR sickness prediction model learned in advance. Also, the output unit displays the input image/signal, the feature point, the motion sickness level, etc. using the GUI. For example, the output unit may display the input image/signal, the feature point, the motion sickness level, etc. using graphs, numerical values, and images.

Meanwhile, when the input data required for calculating the motion sickness level is insufficient, the prediction unit 320 according to an embodiment may predict the corresponding data from a given input. Specifically, the biological signal and user motion prediction unit 370 may predict the biological signal or the user motion that is difficult to actually acquire when experiencing the virtual reality content, from the given input of virtual reality content. Also, the prediction image generation unit 380 may generate and render a picture expected to be displayed on the HMD device by using a head motion predicted from the biological signal and user motion prediction unit 370 even though the user does not actually experience the virtual reality content through the HMD device.

An input of the VR sickness prediction model monitoring apparatus 300 according to an embodiment may be an image of the virtual reality content produced in advance, user motion, biological signal, or the like, but is not limited thereto, and further may be customized for additional inputs.

FIG. 4 is a view showing a screen displayed by the VR sickness prediction model monitoring apparatus for virtual reality content when a user input is an input selected to display the first data related to the virtual reality content according to an embodiment.

Referring to FIG. 4, the VR sickness prediction model monitoring apparatus 400 may display a virtual reality content 410 or a viewing screen 420 of the user wearing the HMD device in such a manner as to synchronize to each other. Both of the images may be displayed or only one of the images may be selectively displayed on the screen. The VR sickness prediction model monitoring apparatus 400 according to an embodiment may display a time line 430, a monitoring mode 440, analysis information 450, or the VR sickness list 460 (or motion sickness level). Specifically, the time line 430 is changed by the user input to select a playback time or a playback section, in which images and related data at the changed time section may be displayed on the screen. In the case of the analysis information 450, graphs and chart information displayed on the screen may be activated differently depending on a type selected from the monitoring mode 440 and the playback time selected from the time line 430. In the case of the motion sickness level 460, the result of the type selected from the monitoring mode 440 and the playback time selected from the time line 430 may be displayed on the screen.

Referring to FIG. 4, when a data mode Data is selected from the monitoring mode 440 (i.e., when the user input is an input selected to display the first data related to virtual reality content), the VR sickness prediction model monitoring apparatus 400 according to an embodiment may display information including coordinate and rotation information of the object, coordinate and rotation information of the camera, head motion of the user, the biological signal of the user, and the like (that is, the VR sickness inducing-factors of the virtual reality content, the first VR sickness information, the second VR sickness information, or the correlation information between the VR sickness inducing-factors determined in advance via machine learning and the VR sickness list).

FIG. 5 is a view showing a screen displayed by the VR sickness prediction model monitoring apparatus for virtual reality content when the user input is an input selected to display the second data acquired by processing the first data according to an embodiment.

Referring to FIG. 5, when an analysis mode Analysis is selected from the monitoring mode 440 (that is, when the user input is an input selected to display the second data), the VR sickness prediction model monitoring apparatus 400 according to an embodiment processes the input data as feature point information capable of predicting the motion sickness level and display the processed data (that is, a part of the first data may be substituted for one of the VR sickness inducing-factors, and a result of the substitution may be displayed so that the user may more easily confirm the VR sickness information). For example, the position and rotation information of the object may be processed (or substituted) as the velocity and acceleration information corresponding thereto, and the EEG signal may be processed into frequency-specific power information for spectral analysis. According to an embodiment, the feature point information that is activated may be determined in advance by factors affecting the motion sickness level. Therefore, the VR sickness prediction model monitoring apparatus 400 may sequentially display the feature points having high correlation with inducing the motion sickness using a graph or chart, and what information is displayed may be determined by the user input.

FIG. 6 is a view showing an analysis result for virtual reality content at a playback section determined on the basis of a user input on a screen of the VR sickness prediction model monitoring apparatus for virtual reality content according to an embodiment.

Referring to FIG. 6, on the basis of a user input wherein a first time 610 and a second time 620 are selected, the VR sickness prediction model monitoring apparatus 400 may display an analysis result for the virtual reality content at a section between the first time 610 and the second time 620. Therefore, by freely setting a section in the timeline through the user input, the user may process a destined feature point or extract statistical characteristics for the data within the designated time. On the other hand, it is possible to support a processing function into other forms (for example, it is possible to add a function that the user wants, such as an average of the speed, various statistical characteristics, and the like), in which the predetermined motion sickness level computing parameters are not affected, whereby a predicted value of the motion sickness level to be output is not affected.

FIG. 7 is a view showing a screen displayed by the VR sickness prediction model monitoring apparatus for virtual reality content when a user input is an input selected to display a prediction image for the second virtual reality content according to an exemplary embodiment Referring to FIG. 7, when a prediction mode Prediction is selected from the monitoring mode 440 (that is, when the user input is an input selected to display the prediction image for the second virtual reality content), the VR sickness prediction model monitoring apparatus 400 according to an embodiment may predict the biological signal or the user motion information on the basis of the VR sickness prediction model learned in advance using machine learning based on supervised learning and regression analysis technique, and display the predicted information (that is, the first virtual reality content or the first data is analyzed, thereby determining a prediction image for the second virtual reality content and displaying the determined image). For example, when the user does not wear the HMD device directly or does not attach the biological signal detection sensor to his or her body, it is difficult to acquire data such as the image that the user is actually experiencing or the head motion of the user through the HMD device. Accordingly, when the virtual reality content is given and there is no data of a biological signal or of a head motion of a user, the VR sickness prediction model monitoring apparatus 400 according to an embodiment is capable of predicting the corresponding data using a function of the prediction mode Prediction.

FIG. 8 is a view showing a screen displayed by the VR sickness prediction model monitoring apparatus for virtual reality content when a user input is an input selected to display a simulation result for the virtual reality content according to an embodiment.

Referring to FIG. 8, when a simulation mode Simulation is selected from the monitoring mode 440 (that is, when the user input is an input selected to display a simulation result for the virtual reality content), the VR sickness prediction model monitoring apparatus 400 according to an embodiment additionally acquires a user input to change the user motion information and display an analysis result for the virtual reality content according to the acquired user motion information (that is, as the user input is additionally acquired in order to change values of the VR sickness inducing-factors, it is possible to change values of the VR sickness list items and display the changed VR sickness list using a GUI). For example, in the case that there is no data for head motion of a user, when receiving the user input to select a control button 810, the VR sickness prediction model monitoring apparatus 400 activates a controller 820 that is capable of controlling the head motion of a user and displays the head motion using the activated controller 820. The controller 820 according to an embodiment may be in the form of a jog dial, but is not limited thereto, and various GUI-based interaction techniques may be applied to display head motion data, including a method of directly dragging a screen.

FIG. 9 is a flowchart illustrating an operation method of a VR sickness prediction model monitoring apparatus for virtual reality content according to an embodiment In step S900, the VR sickness prediction model monitoring apparatus displays the virtual reality content on a display unit.

The VR sickness prediction model monitoring apparatus according to an embodiment displays a virtual image, a user interface for selecting the virtual image, and a user interface for setting an operation of the virtual image on the display unit. Also, the VR sickness prediction model monitoring apparatus displays information processed in an HMD device or an external immersive virtual reality imaging device.

In step S910, the VR sickness prediction model monitoring apparatus may acquire a user input.

The user input according to an embodiment may include an input to select a playback time of the virtual reality content. Also, the user input according to an embodiment may include an input selected to display a first data related to the virtual reality content, a second data acquired by processing the first data, a prediction image for the second virtual reality content, or a simulation result for the virtual reality content on the display unit.

In step S920, the VR sickness prediction model monitoring apparatus may analyze the virtual reality content on the basis of the user input acquired in the step 910.

In step S930, the VR sickness prediction model monitoring apparatus may display an analysis result for the virtual reality content acquired in the step S920 on the display unit.

When the user input is an input to select a playback time of the virtual reality content, the VR sickness prediction model monitoring apparatus according to an embodiment may display the analysis result for the virtual reality content at a playback section corresponding to the playback time.

In addition, when the user input is an input selected to display the first data related to the virtual reality content, the VR sickness prediction model monitoring apparatus according to an embodiment may perform control such that the virtual reality content is analyzed, thereby displaying the VR sickness inducing-factors of the virtual reality content, a first VR sickness information, a second VR sickness information, or a correlation information between the VR sickness inducing-factors determined in advance via machine learning and the VR sickness list.

In addition, when the user input is an input selected to display the second data, the VR sickness prediction model monitoring apparatus according to an embodiment may substitute a part of the first data for one of the VR sickness inducing-factors and display a result of the substitution so that a user may more easily confirm the VR sickness information.

In addition, when the user input is an input selected to display a prediction image for the second virtual reality content, the VR sickness prediction model monitoring apparatus according to an embodiment may analyze the first virtual reality content or the first data, thereby determining the prediction image for the second virtual reality content and displaying the determined image.

In addition, when the user input is an input selected to display a simulation result for the virtual reality content, the VR sickness prediction model monitoring apparatus according to an embodiment may change values of the VR sickness list items and display the changed VR sickness list using a GUI as the user input is additionally acquired in order to change values of the VR sickness inducing-factors.

Referring to FIGS. 1 to 9, the operation method of the VR sickness prediction model monitoring apparatus for virtual reality content according to an embodiment of this disclosure has been described above.

Hereinafter, a specific process of determining the VR sickness list will be described with reference to FIGS. 10 to 15.

In recent years, as HMDs have become widespread in popularity, the availability of virtual reality technology is increasing. In order to improve the market performance and practical use of such virtual reality technology, it is necessary to solve VR sickness such as motion sickness which may be caused to the user experiencing the virtual reality content and thus ensure long-term usability.

In order to avoid motion sickness, a feeling of fatigue, and the like that may occur when experiencing a video through a VR HMD, the VR latency time should be fundamentally reduced. In general, when the VR latency time is less than 20 ms, it is experimentally/theoretically known that the VR sickness is alleviated considerably. The VR latency time consists of head tracking information processing time and VR image rendering time in the case of PC based VR HMD, and latency time due to network transmission has to be considered in the case of a mobile type such as a mobile phone. Specifically, the HMD head tracking depends on hardware and the performance thereof is determined for each product used. The VR rendering depends on system specifications and the complexity of the virtual environment.

In addition, the intrinsic characteristics of the VR HMD image content are known to have a great influence on the VR sickness in addition to the VR latency time, and specifically may be determined by various system parameters such as a movement of a camera, movement of graphic object, resolution, field of view, binocular disparity, texture, special effects, and the like.

On the other hand, a methodology of evaluating the degree of VR sickness caused by experiencing the VR content is based on a questionnaire survey for identifying the cause of a feeling of fatigue and a fatigue evaluation based on a biological signal measurement for 3D stereo images in the related art. Specifically, the objective evaluation method based on the biological signal measurement or the like is a method of analyzing a change in the user occurring by sensing a signal generated from the user continuously before and after experiencing the VR content, as well as during experiencing the VR content. On the other hand, the subjective method using the questionnaire survey is a method including a preliminary questionnaire survey before being visually stimulated by the VR content and a VR sickness survey for the VR content after experiencing the VR content and completing the experience thereof. Referring to FIG. 10, since the user is wearing equipment such as an HMD while being exposed to VR content, it is difficult to conduct the questionnaire survey. Accordingly, the questionnaire survey is conducted before and after experiencing and experiencing the VR content, whereby there are problems that it is difficult to know exactly where the user feels motion sickness when the experience time is long, and it is difficult to receive feedback from the user while watching and experiencing the VR content.

FIG. 11 is a view illustrating a system for analyzing VR sickness for virtual reality content using a sensor and user input according to an embodiment.

The VR sickness analysis apparatus for virtual reality content according to an embodiment may display virtual reality content on a display, detect a first VR sickness information of a user experiencing the virtual reality content using a sensor, and determine a second VR sickness using a user input that is input from the user in response to a request for inputting a degree of VR sickness for the virtual reality content.

A sensor according to an embodiment may include an image capturing sensor (or observation type sensor) or a biological signal detection sensor (or a wearable sensor).

Referring to FIGS. 1 and 11, when a user 40 wearing a video display device 20 such as a HMD is experiencing the virtual reality content displayed on the video display device 20, the VR sickness analysis apparatus for virtual reality content may track changes in the posture, the state, the pupils, the facial expression, the gesture, and the voice of the user 40 using the observation type sensor 50. According to an embodiment, the observation type sensor 50 may include, but is not limited to, an MRI, an FMRI, an image sensor, an infrared sensor, and the like, and may include a sensor that is capable of tracking a user motion. In addition, the VR sickness analysis apparatus for virtual reality content includes a sensor capable of detecting a biological signal such as an electroencephalogram EEG, an electrocardiogram ECG, picopicogram PPG, galvanic skin response GSR, and a vomiting measurement of the user 40 using a wearable sensor 30. An image of the user acquired from the image capturing sensor or the magnitude of a biological signal of the user acquired from the biological signal detection sensor may be referred to as the first VR sickness information (or objective VR sickness information).

In addition, the VR sickness analysis apparatus for virtual reality content may receive a degree of VR sickness from the user in response to a request for inputting the degree of the VR sickness for the virtual reality content before/after or during providing (or exposing) the virtual reality content to the user. The request for inputting the degree of the VR sickness for the virtual reality content according to an embodiment may be issued to the user at a predetermined time interval. In addition, the user input according to an embodiment may be an input through a user interface displayed on the display unit or an input from an input device provided in the VR sickness analysis apparatus. The information acquired from the user in response to the request for inputting the degree of the VR sickness for the virtual reality content is referred to as the second VR sickness information (or subjective VR sickness information), which will be described later.

The virtual fatigue analysis apparatus for virtual reality content according to an embodiment may determine a user's VR sickness list for the virtual reality content on the basis of the first VR sickness information and the second VR sickness information.

According to an embodiment, the user's VR sickness list for the virtual reality content is information including the corresponding virtual reality content, the items in the user's VR sickness list, and the magnitude of each item, in which the VR sickness list items according to the embodiments may include, but are not limited to, discomfort, fatigue, headache, eye fatigue, difficulties with focusing, sweating, nausea, difficulties with attention, brain fog, visual acuity, dizziness, hallucinations, stomachache, motion sickness, burping, or other symptoms, and may further include specific symptoms that may be caused by experiencing the virtual reality content.

Meanwhile, the second VR sickness information according to an embodiment may be the degrees of the VR sickness list items that are input from the user in response to a request for inputting the degree of the VR sickness for the virtual reality content. For example, the VR sickness analysis apparatus may acquire the degree for each item of headache, nausea, and dizziness input from the user in response to the request for inputting the degree of the VR sickness while experiencing the virtual reality content called A. In addition, the second VR sickness information according to an embodiment may be input through a user interface displayed on a display unit or from an input device provided in the VR sickness prediction model monitoring apparatus, or acquired using the result of writing a simulation sickness questionnaire. According to an embodiment, the input device provided in the VR sickness prediction model monitoring apparatus may be a user interface tool such as a controller, but is not limited thereto.

On the other hand, the VR sickness analysis apparatus for virtual reality content according to an embodiment may apply a given weight acquired using the first VR sickness information to a degree of at least one of the VR sickness list items acquired from the second VR sickness information, thereby determining the magnitudes of the VR sickness list items included in the VR sickness list.

For example, when the VR sickness analysis apparatus for the virtual reality content is tracking a change in the posture or voice of a user using the image capturing sensor, the first VR sickness information may be information acquired by tracking a change in the posture or voice of the user, and the VR sickness analysis apparatus acquires a first weight from the change in the posture or expression of the user and a second weight from the change in the voice of the user. In addition, when the second VR sickness information acquired through the user input is the degree for each item of fatigue, nausea and burping, the VR sickness analysis apparatus applies the first weight to the items of fatigue and nausea, and the second weight to the item of burping, thereby determining the magnitudes of fatigue, nausea, and burping. As a result, the VR sickness analysis apparatus may determine the corresponding virtual reality content and the VR sickness list for the user.

FIG. 12 is a block diagram illustrating a configuration of a VR sickness analysis apparatus for virtual reality content according to an embodiment.

Referring to FIG. 12, the VR sickness analysis apparatus 1200 for virtual reality content according to an embodiment may include a display unit 1210, a control unit 1220, and a user input unit 1230. It should be noted, however, that this is only illustrative of some of the components necessary for explaining the present embodiment, and components included in the VR sickness prediction model monitoring apparatus 1200 are not limited to the examples described above.

Referring to FIG. 12, the display unit 1210 converts a video signal, a data signal, an OSD signal, and a control signal processed in the control unit 1220 to generate a driving signal. The display unit 1210 may display content (e.g., moving picture) input through a communication unit or an input/output unit. The display unit 1210 also outputs image stored in a storage unit under the control of the control unit 1220. In addition, the display unit 1210 displays a voice user interface UI (for example, including voice command guide) for performing a voice recognition task corresponding to voice recognition or motion user interface UI (for example, including user motion guide for motion recognition) for performing motion recognition task corresponding to motion recognition. Also, the display unit 1210 may display and output information processed by the VR sickness analysis apparatus 1200. For example, the display unit 1210 may display a virtual image, a user interface for selecting the virtual image, or a user interface for setting an operation of the virtual image. The display unit 1210 may also display information processed in an HMD device or an external immersive virtual reality imaging device.

The display unit 1210 according to an embodiment may display the virtual reality content.

The controller 1220 controls the overall operation of the VR sickness analysis apparatus 1200 for the virtual reality content and the signal flow between internal components of the VR sickness analysis apparatus 200 for virtual reality content and performs a function of processing data. The control unit 1220 may execute various applications stored in the storage unit when an input is performed by the user or a predefined condition is satisfied.

The controller 1220 according to an embodiment may detect a first VR sickness information of a user experiencing the virtual reality content using a sensor, determine a second VR sickness information using a user input that is input to the user input unit 1230 in response to a request for inputting a degree of the VR sickness for the virtual reality content, and determine user's VR sickness list for the virtual reality content on the basis of the first VR sickness information and the second VR sickness information.

In addition, the controller 1220 according to an embodiment may determine the magnitudes of the VR sickness list items included in the VR sickness list using the first VR sickness information and the second VR sickness information.

In addition, the controller 1220 according to an embodiment may apply a given weight acquired by using the first VR sickness information to the degrees of the VR sickness list items acquired from the second VR sickness information, thereby determining the magnitudes of the VR sickness list items included in the VR sickness list.

The user input unit 1230 is defined as a means for a user to input data for controlling the VR sickness analysis apparatus 1200 for the virtual reality content. For example, the user input unit 1230 may include, but is not limited to, a keypad, a dome switch, a touchpad (contact capacitance method, pressure resistive membrane method, infrared sensing method, surface ultrasonic conductive method, integral tension measuring method, piezo effect method, etc.), a jog wheel, a jog switch, and the like.

The user input unit 1230 according to an embodiment may receive a user input in response to a request for inputting a degree of VR sickness for the virtual reality content. The user input may also be an input through a user interface displayed on the display unit 1210 or an input from an input device provided on the VR sickness analysis apparatus 1200. According to an embodiment, the input device equipped with the VR sickness analysis apparatus 1200 may be a user interface tool such as a controller, but is not limited thereto.

FIG. 13 is a view illustrating a process of determining subjective VR sickness of the VR sickness analysis apparatus for virtual reality content according to an embodiment.

The VR sickness analysis apparatus for virtual reality content may make a request for inputting a degree of the VR sickness for the virtual reality content to a user experiencing the virtual reality content. According to an embodiment, the request for inputting the degree of the VR sickness may be issued to the user at a predetermined time interval. For example, referring to FIG. 13, the VR sickness analysis apparatus makes a request 1300, 1310, and 1320 for inputting a degree of the VR sickness to the user experiencing the virtual reality content at the predetermined time interval, and receives the user input in response to the request for inputting the degree of VR sickness from the user. The user input may be an input through a user interface displayed on the display unit 1210 or an input from an input device equipped with the VR sickness analysis apparatus 1200. For example, the user input may be input by pressing a button in accordance with the degree (or score) of VR sickness in the controller equipped with the VR sickness analysis apparatus, or input by speaking the degree (or score) of VR sickness via a microphone equipped with the VR sickness analysis apparatus. Since the degree of VR sickness of the user may be measured while the virtual reality content is exposed to the user, it is possible to know which portion of the virtual reality content causes a high degree of VR sickness, and thus determine the factors affecting the degree of VR sickness and easily analyze the sensitivity characteristic to VR sickness for each user.

FIG. 14 is a view illustrating a process of determining subjective VR sickness by the VR sickness analysis apparatus for virtual reality content according to another embodiment.

The VR sickness analysis apparatus according to an embodiment may determine subjective VR sickness using multiple individual virtual reality contents. The individual virtual reality content means that a value of at least one VR sickness-inducing factor causing the VR sickness for the virtual reality content is controlled, in which the VR sickness inducing-factors include, but are not limited to, movement of a camera, movement of an object, playback information, resolution, binocular parallax, depth of field, angle of view, image feature, special effect, and texture effect, and may further include factors capable of causing VR sickness such as motion sickness to a user experiencing the virtual reality content, such as a change in intrinsic characteristics of the content or extrinsic characteristics of the content (for example, movement of an object, movement of a camera).

Referring to FIG. 14, the virtual reality content is configured to include n individual virtual reality contents, and the VR sickness analysis apparatus makes a request for inputting a degree of VR sickness for the virtual reality content to a user experiencing the virtual reality content at a predetermined time interval.

FIG. 15 is a flowchart illustrating an operation method of a VR sickness analysis apparatus for virtual reality content according to an embodiment.

In step S1500, the VR sickness analysis apparatus may display the virtual reality content on the display unit.

The VR sickness analysis apparatus according to an embodiment may display a virtual image, a user interface for selecting the virtual image, or a user interface for setting an operation of the virtual image, on the display unit. The VR sickness analysis apparatus may also display information processed in an HMD device or an external immersive virtual reality imaging device.

In step S1510, the VR sickness analysis apparatus may detect a first VR sickness information of a user experiencing the virtual reality content using a sensor.

The first VR sickness information according to an embodiment may be an image of the user acquired from the image capturing sensor and the magnitude of a biological signal of the user acquired from the biological signal detection sensor.

In step S1520, the VR sickness analysis apparatus may determine a second VR sickness information using a user input that is input from the user, in response to a request for inputting the VR sickness for virtual reality content.

The request for inputting the VR sickness according to an embodiment may be issued to the user at a predetermined time interval, and the user input according to an embodiment may be an input through a user interface displayed on the display unit or an input from an input device equipped with the VR sickness analysis apparatus.

The second VR sickness information according to an embodiment may be the degrees of VR sickness list items that are input from the user in response to the request for inputting the degree of the VR sickness for virtual reality content. According to an embodiment, the VR sickness list items may include, but are not limited to, discomfort, fatigue, headache, eye fatigue, difficulties with focusing, sweating, nausea, difficulties with attention, brain fog, visual acuity, dizziness, hallucinations, stomachache, cyber sickness, burping, or other symptoms, and may further include specific symptoms that may be caused by experiencing the virtual reality content.

In step S1530, the VR sickness analysis apparatus may determine the user's VR sickness list for virtual reality content on the basis of the first VR sickness information and the second VR sickness information.

According to one embodiment, the VR sickness analysis apparatus applies a given weight acquired by using the first VR sickness information to a degree of at least one of the VR sickness list items acquired from the second VR sickness information, thereby determining the magnitude of the VR sickness list items included in the VR sickness list.

According to the present invention, there is provided a VR sickness analysis apparatus for virtual reality content, including a display unit displaying the virtual reality content; a user input unit; and a controller for detecting a first VR sickness information of a user experiencing the virtual reality content using a sensor, determining a second VR sickness using a user input that is input from the user in response to a request for inputting a degree of VR sickness for the virtual reality content, and determining a user's VR sickness list for the virtual reality content on the basis of the first VR sickness information and the second VR sickness information.

In the VR sickness analysis apparatus according to the present invention, the sensor may include at least one of an image capturing sensor and a biological signal detection sensor, and the first VR sickness information is at least one of the image of the user acquired from the image capturing sensor and the magnitude of the biological signal of the user acquired from the biological signal detection sensor.

In the VR sickness apparatus according to the present invention, the request for inputting the degree of VR sickness for the virtual reality content may be issued to the user at a predetermined time interval.

In the VR sickness analysis apparatus according to the present invention, the user input may include at least one of an input via a user interface displayed on the display unit and an input from an input device equipped with the apparatus.

In the VR sickness analysis apparatus according to the present invention, the VR sickness list may include at least one of discomfort, fatigue, headache, eye fatigue, difficulties with focusing, sweating, nausea, difficulties with attention, brain fog, visual acuity, dizziness, hallucinations, stomachache, cyber sickness, burping, or other symptoms as the VR sickness list items, and the controller may determine the magnitude of at least one of the VR sickness list items included in the VR sickness list using the first VR sickness information and the second VR sickness information.

In the VR sickness analysis apparatus according to the present invention, the second VR sickness information may be the degrees of the VR sickness list items that are input to the user input unit in response to the request for inputting the degree of VR sickness for the virtual reality content.

In the VR sickness analysis apparatus according to the present invention, the controller may apply an any weight acquired using the first VR sickness information to a degree of at least one of the VR sickness list items acquired from the second VR sickness information, thereby determining the degree of at least one of the VR sickness list items included in the VR sickness list.

In the VR sickness analysis apparatus according to the present invention, the virtual reality content includes at least one individual virtual reality content, and each of the at least one individual virtual reality content is such that the magnitude of at least one VR sickness inducing-factor causing the VR sickness for the virtual reality content is controlled, and the VR sickness inducing-factors include movement of a camera, movement of an object, playback information, resolution, binocular parallax, depth of field, angle of view, image feature, special effect, and texture effect.

In addition, according to the present invention, there is provided a VR sickness analysis method for virtual reality content, including a step of displaying the virtual reality content on the display unit; a step of detecting the first VR sickness information of a user experiencing the virtual reality content using a sensor; a step of determining the second VR sickness information using a user input that is input from the user in response to a request for inputting a degree of the VR sickness for the virtual reality content; and determining the user's VR sickness list for the virtual reality content on the basis of the first VR sickness information and the second VR sickness information.

In the VR sickness analysis method according to the present invention, the sensor includes at least one of an image capturing sensor and a biological signal detection sensor, and the first VR sickness information is at least one of the image of the user acquired from the image capturing sensor and the magnitude of the biological signal of the user acquired from the biological signal detection sensor.

In the VR sickness analysis method according to the present invention, the request for inputting a degree of the VR sickness for the virtual reality content is issued to the user at a predetermined time interval.

In the VR sickness analysis method according to the present invention, the user input includes at least one of an input through a user interface displayed on the display unit and an input from an input device equipped with the apparatus.

In the VR sickness analysis method according to the present invention, the VR sickness list includes discomfort, fatigue, headache, eye fatigue, difficulties with focusing, sweating, nausea, difficulties with attention, brain fog, visual acuity, dizziness, hallucinations, stomachache, cyber sickness, burping, or other symptoms, and the step of determining the user's VR sickness list includes a step of determining the magnitude of at least one of the VR sickness list items included in the VR sickness list using the first VR sickness information and the second VR sickness information.

In the VR sickness analysis method according to the present invention, the second VR sickness information is the degree of at least one of the VR sickness list items that is input from the user in response to the request for inputting the degree of the VR sickness for the virtual reality content.

In the VR sickness analysis method according to the present invention, the step of determining the user's VR sickness list includes a step of applying a given weight acquired by using the first VR sickness information to the degree of at least one of the VR sickness list items acquired from the second VR sickness information, thereby determining the magnitude of at least one of the VR sickness list items included in the VR sickness list.

In the VR sickness analysis method according to the present invention, the virtual reality content includes at least one individual virtual reality content, and the at least one individual virtual reality content is such that the magnitude of at least one VR sickness inducing-factors causing the VR sickness for the virtual reality content is controlled, and the VR sickness inducing-factors includes movement of a camera, movement of an object, playback information, resolution, binocular parallax, depth of field, angle of view, image feature, special effect, and texture effect.

The VR sickness analysis apparatus and method according to the present disclosure can easily and correctly determine the VR sickness of the user experiencing the visual reality content via the image display device such as HMD, by analyzing the sensor and the user input.

In addition, according to the present disclosure, it is possible to more easily receive feedback from the user by measuring subjective VR sickness using a user interface or the like even while experiencing the virtual reality content.

According to the present disclosure, it is possible to provide an apparatus and a method of visually monitoring a correlation model between VR sickness-inducing factors of virtual reality content acquired by performing machine learning based on supervised learning and VR sickness for virtual reality content.

In addition, according to the present disclosure, since subjective experience such as motion sickness/fatigue that may occur when experiencing the virtual reality content is objectively and quantitatively expressed, potential risk factors can be eliminated and the user's body comfort can be guaranteed.

In addition, according to the present disclosure, information (e.g., object movement, camera movement, biological signal, head motion, VR sickness, etc.) associated with a user experiencing the virtual reality content through an image display device such as HMD device is analyzed in real time, whereby the corresponding analysis information can be provided as an effective guideline to content providers and producers.

In addition, according to the present disclosure, various information related to a given virtual reality image content can be predicted without actually using an HMD device or a bio-signal detection sensor.

Also, according to the present disclosure, information related to the virtual reality content is processed and analyzed, thereby providing the related statistical information and facilitating effectiveness verification and performance analysis in various virtual reality applications including sports, games, virtual training, and medical care.

Further, according to the present disclosure, since the various data, the motion sickness level, and the visual image are visually displayed, it is possible to more easily know the motion sickness element.

The VR sickness analysis apparatus and method according to the present disclosure can easily and correctly determine the VR sickness of the user experiencing the visual reality content via the image display device such as HMD, by analyzing the sensor and the user input.

In addition, according to the present disclosure, it is possible to more easily receive a feedback from the user by measuring subjective VR sickness using a user interface or the like even while experiencing the virtual reality content.

Meanwhile, according to an aspect of the present disclosure, there is provided a software or computer-readable medium having executable instructions in order to perform an operation method of the VR sickness prediction model monitoring apparatus for the virtual reality content. The executable instructions may include a step of displaying the virtual reality content on the display unit, a step of acquiring the user input, a step of analyzing the virtual reality content on the basis of the acquired user input, and a step of displaying the analysis result for the virtual reality content on the display unit.

In addition, according to an aspect of the present disclosure, there is provided a software or computer-readable medium having executable instructions in order to perform an operation method of the VR sickness prediction model monitoring apparatus for the virtual reality content. The executable instructions may include, in the step of analyzing the VR sickness for the virtual reality content, a step of displaying the virtual reality content on the display unit, a step of detecting the first VR sickness information of the user experiencing the virtual reality content using a sensor, a step of determining the second VR sickness using a user input that is input from the user in response to the request for inputting the degree of the VR sickness, and a step of determining the user's VR sickness list for the virtual reality content on the basis of the first VR sickness information and the second VR sickness information.

Although exemplary methods of the present disclosure are described as a series of operation steps for clarity of a description, the present disclosure is not limited to the sequence or order of the operation steps described above. The operation steps may be simultaneously performed, or may be performed sequentially but in different order. In order to implement the method of the present disclosure, additional operation steps may be added and/or existing operation steps may be eliminated or substituted.

Various embodiments of the present disclosure are not presented to describe all of available combinations but are presented to describe only representative combinations. Steps or elements in various embodiments may be separately used or may be used in combination.

In addition, various embodiments of the present disclosure may be embodied in the form of hardware, firmware, software, or a combination thereof. When the present disclosure is embodied in a hardware component, it may be, for example, an application specific integrated circuit (ASIC), a digital signal processor (DSP), a digital signal processing device (DSPD), a programmable logic device (PLD), a field programmable gate array (FPGA), a general processor, a controller, a microcontroller, a microprocessor, etc.

The scope of the present disclosure includes software or machine-executable instructions (for example, operating systems (OS), applications, firmware, programs) that enable methods of various embodiments to be executed in an apparatus or on a computer, and a non-transitory computer-readable medium storing such software or machine-executable instructions so that the software or instructions can be executed in an apparatus or on a computer.

The invention claimed is:

1. An apparatus for monitoring a VR (Virtual Reality) sickness prediction model for virtual reality content, the apparatus comprising:
    a display unit displaying the virtual reality content;
    a user input unit acquiring a user input; and
    a control unit performing control such that the virtual reality content is analyzed on a basis of the acquired user input and an analysis result for the virtual reality content is displayed on the display unit,
    wherein the display unit further displays simultaneously each of a viewing screen of a user wearing an HMD (head-mounted display) device, a time line, a monitoring mode, and the analysis result,
    wherein the virtual reality content includes at least one of a first virtual reality content produced in advance and a second virtual reality content displayed on the HMD device worn by the user as an image corresponding to the first virtual reality content,
    wherein the user input includes a first data related to the virtual reality content, a second data acquired by processing the first data, a prediction image on the second virtual reality content, and a simulation result on the virtual reality content is displayed on the display unit,
    wherein, when the user input is an input selected to display the prediction image for the second virtual reality content on the display unit, the control unit performs control such that biological signal or user motion information is predicted on the basis of VR sickness prediction model learned in advance using machine learning based on supervised learning and regression analysis technique and displaying the predicted information on the display unit, and
    wherein the prediction image on the second virtual reality content comprises the biological signal or the user motion information on the basis of the VR sickness prediction model learned in advance using machine learning.

2. The apparatus according to claim 1, wherein the user input further includes an input to select at least one playback time of the virtual reality content, and the controller performs control such that the analysis result for the virtual reality content is displayed on the display unit at a playback section corresponding to the selected at least one playback time.

3. The apparatus according to claim 2, wherein
    the first data includes at least one of VR sickness inducing-factors of the virtual reality content, a first VR sickness information, a second VR sickness information, and
    a correlation information between the VR sickness-inducing factors determined in advance via machine learning and a VR sickness list;
    the VR sickness-inducing factors of the virtual reality content include movement of a camera, movement of an object, playback information, resolution, binocular parallax, depth of field, angle of view, image feature, special effect, and texture effect;
    the VR sickness list includes at least one of discomfort, fatigue, headache, eye fatigue, difficulties with focusing, sweating, nausea, difficulties with attention, brain fog, visual acuity, dizziness, hallucinations, stomachache, cyber sickness, burping, and other symptoms as VR sickness list items;
    the first VR sickness information includes at least one of an image of the user acquired from an image capturing sensor and a magnitude of a biological signal of the user acquired from a biological signal detection sensor; and
    the second VR sickness information is a degree of at least one of the VR sickness list items input from the user in response to the request for inputting the degree of the VR sickness for the virtual reality content.

4. The apparatus according to claim 3, wherein, when the user input is an input selected to display the first data related to the virtual reality content on the display unit, the controller performs control such that the virtual reality content is analyzed, thereby displaying at least one of the VR sickness inducing-factors of the virtual reality content, the first VR sickness information, the second VR sickness information, and the correlation information between the VR sickness-inducing factors determined in advance via machine learning and the VR sickness list, on the display unit.

5. The apparatus according to claim 3, wherein, when the user input is an input selected to display the second data on the display unit, the controller performs control such that at least one of the first data is substituted for one of the VR sickness inducing-factors and a result of the substitution is displayed on the display unit.

6. The apparatus according to claim 3, wherein, when the user input is an input selected to display the simulation result for the virtual reality content on the display unit, the controller performs control such that a value of at least one VR sickness list item in the VR sickness list is changed, and the changed VR sickness list is displayed on the display unit using a graphical user interface (GUI), as the user input is additionally acquired in order to change a value of at least one of the VR sickness-inducing factors.

7. A method of monitoring a VR (Virtual Reality) sickness prediction model for virtual reality content, the method comprising:
    displaying the virtual reality content on a display unit;
    acquiring a user input;
    analyzing the virtual reality content on a basis of the acquired user input; and
    displaying an analysis result for the virtual reality content on the display unit,
    wherein the display unit further displays simultaneously each of a viewing screen of a user wearing an HMD (head-mounted display) device, a time line, a monitoring mode, and the analysis result,
    wherein the virtual reality content includes at least one of a first virtual reality content produced in advance and a second virtual reality content displayed on the HMD device worn by the user as an image corresponding to the first virtual reality content,
    wherein the user input further includes a first data related to the virtual reality content, a second data acquired by processing the first data, and an input selected so that at least one of a prediction image on the second virtual reality content, and a simulation result on the virtual reality content is displayed on the display unit, wherein, when the user input is an input selected to display the prediction image for the second virtual reality content on the display unit, the control unit performs control such that biological signal or user motion information is predicted on the basis of VR sickness prediction model learned in advance using machine learning based on supervised learning and regression analysis technique and displaying the predicted information on the display unit, and wherein the prediction image on the second virtual reality content comprises the biological signal or the user motion information on the basis of the VR sickness prediction model learned in advance using machine learning.

8. The method according to claim 7, wherein the user input further includes an input to select at least one playback time of the virtual reality content, and the displaying of the analysis result for the virtual reality content on the display unit includes displaying the analysis result for the virtual reality content on the display unit at a playback section corresponding to the selected at least one playback time.

9. The method according to claim 8, wherein the first data includes at least one of VR sickness inducing-factors of the virtual reality content, a first VR sickness information, a second VR sickness information, and a correlation information between the VR sickness-inducing factors determined in advance via machine learning and a VR sickness list;

the VR sickness-inducing factors of the virtual reality content include movement of a camera, movement of an object, playback information, resolution, binocular parallax, depth of field, angle of view, image feature, special effect, and texture effect;

the VR sickness list includes at least one of discomfort, fatigue, headache, eye fatigue, difficulties with focusing, sweating, nausea, difficulties with attention, brain fog, visual acuity, dizziness, hallucinations, stomachache, cyber sickness, burping, and other symptoms as VR sickness list items;

the first VR sickness information includes at least one of an image of the user acquired from an image capturing sensor and a magnitude of a biological signal of the user acquired from a biological signal detection sensor; and the second VR sickness information is a degree of at least one of the VR sickness list items input from the user in response to the request for inputting the degree of the VR sickness for the virtual reality content.

10. The method according to claim 9, wherein, when the user input is an input selected to display the first data related to the virtual reality content on the display unit, the displaying of the analysis result for the virtual reality content on the display unit includes analyzing the virtual reality content, thereby displaying at least one of the VR sickness inducing-factors of the virtual reality content, the first VR sickness information, the second VR sickness information, and the correlation information between the VR sickness-inducing factors determined in advance via machine learning and the VR sickness list, on the display unit.

11. The method according to claim 9, wherein, when the user input is an input selected to display the second data on the display unit, the displaying of the analysis result for the virtual reality content on the display unit includes substituting at least one of the first data for one of the VR sickness inducing-factors and displaying a result of the substitution on the display unit.

12. The method according to claim 9, wherein, when the user input is an input selected to display the simulation result for the virtual reality content on the display unit, the displaying of the analysis result for the virtual reality content on the display unit includes changing a value of at least one VR sickness list item in the VR sickness list and displaying the changed VR sickness list on the display unit using a graphical user interface (GUI), as the user input is additionally acquired in order to change a value of at least one of the VR sickness-inducing factors.

* * * * *